(12) United States Patent
Sakai

(10) Patent No.: US 11,212,401 B2
(45) Date of Patent: Dec. 28, 2021

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hiroyuki Sakai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,455

(22) Filed: Dec. 15, 2020

(65) Prior Publication Data
US 2021/0203796 A1    Jul. 1, 2021

(30) Foreign Application Priority Data

Dec. 26, 2019   (JP) .............................. JP2019-236969

(51) Int. Cl.
*G03G 15/00*   (2006.01)
*H04N 1/00*    (2006.01)

(52) U.S. Cl.
CPC ..... *H04N 1/00482* (2013.01); *G03G 15/5016* (2013.01); *G03G 15/5025* (2013.01); *H04N 1/00411* (2013.01); *H04N 1/00474* (2013.01); *H04N 2201/0094* (2013.01)

(58) Field of Classification Search
CPC ........... G03G 15/5016; G03G 15/5025; H04N 1/00411; H04N 1/00474; H04N 1/00482; H04N 2201/0094
See application file for complete search history.

(56) References Cited

U.S. PATENT DOCUMENTS

| 8,223,385 | B2 * | 7/2012 | Minhas .............. H04N 1/00031 358/1.18 |
| 2012/0020694 | A1 * | 1/2012 | Shirata ............... G03G 15/5016 399/81 |

FOREIGN PATENT DOCUMENTS

JP            2008282204 A    11/2008

* cited by examiner

*Primary Examiner* — Hoang X Ngo
(74) *Attorney, Agent, or Firm* — Rossi, Kimms & McDowell LLP

(57) ABSTRACT

An image processing apparatus and a method of controlling the image processing apparatus are provided. The image processing apparatus holds a type of image data and a setting item of image processing corresponding to the type in association with each other, and obtains, by applying a learned learning model to image data which are input, a result of classifying the image data into the type. The image processing apparatus presents, based on the setting item input by a user and the held setting item that corresponds to the type of the obtained image, a recommended setting item corresponding to the image data to the user.

12 Claims, 22 Drawing Sheets

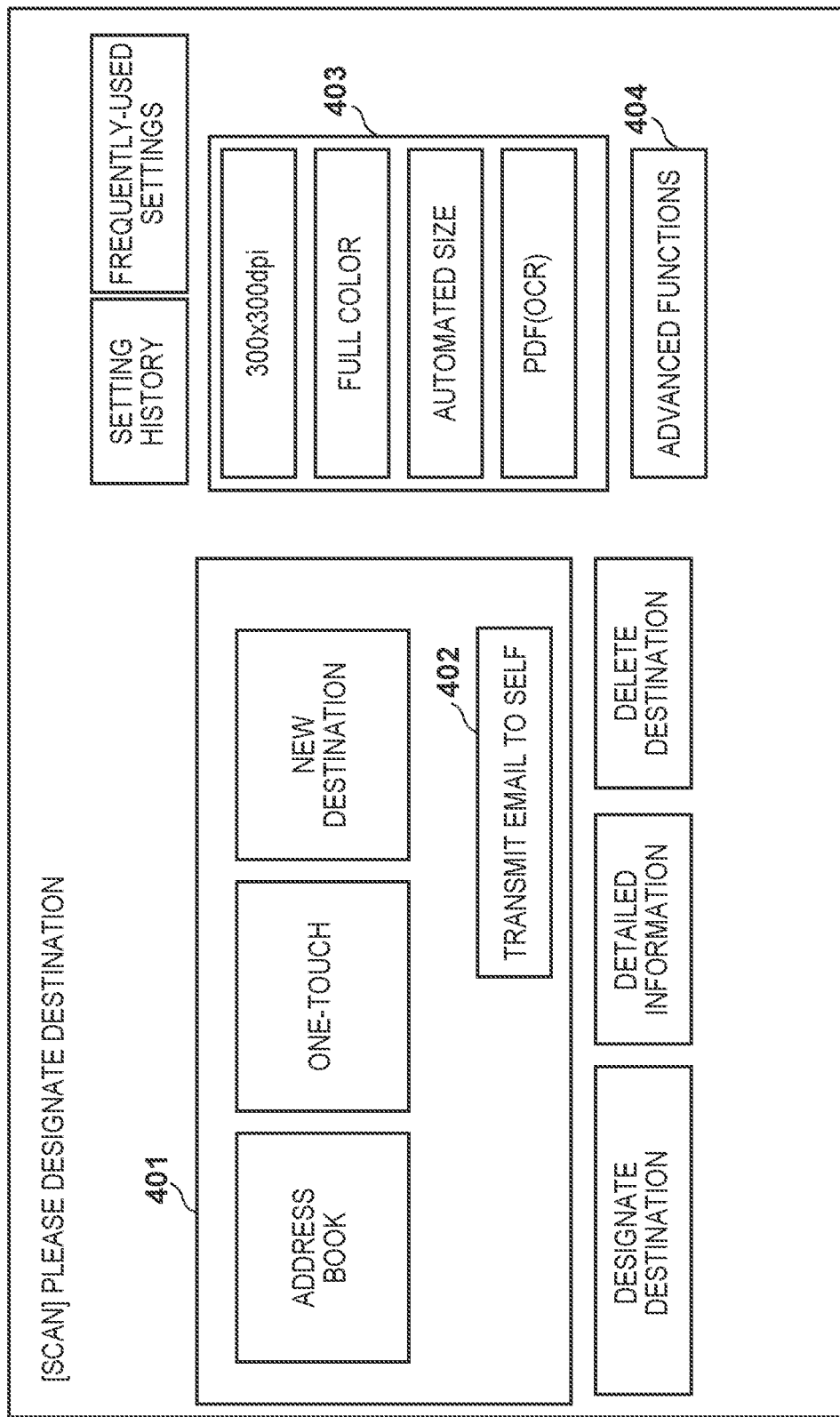

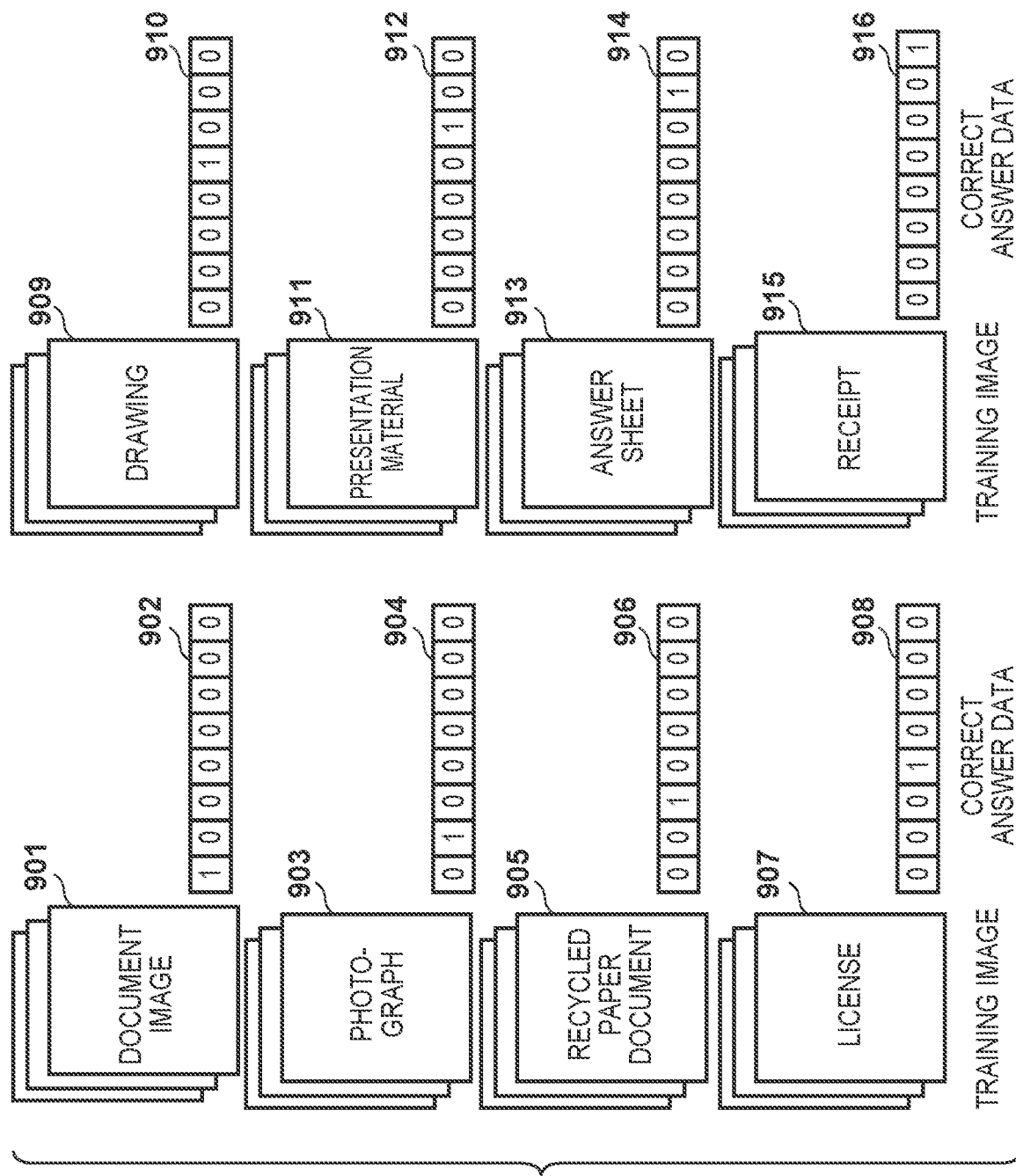

FIG. 10A

| TYPE | DOCUMENT IMAGE | PHOTO-GRAPH | RECYCLED PAPER DOCUMENT | LICENSE | DRAWING | PRESENTA-TION MATERIAL | ANSWER SHEET | RECEIPT |
|---|---|---|---|---|---|---|---|---|
| RECOMMEND-ED SETTING | DENSITY ADJUSTMENT+1 CHARACTER 300x300dpi | PHOTOGRAPH 200x200dpi FULL COLOR | BACKGROUND COLOR REMOVAL+3 300x300dpi FULL COLOR | CHARACTER/ PHOTOGRAPH SHARPNESS+1 400x400dpi FULL COLOR | CHARACTER SHARPNESS+1 400x400dpi GRAYSCALE | CHARACTER/ PHOTOGRAPH | CHARACTERS 300x300dpi FULL COLOR | CHARACTERS SHARPNESS+1 300x300dpi BLACK AND WHITE BINARY |

FIG. 14A

| TYPE | DOCUMENT IMAGE | PHOTO-GRAPH | RECYCLED PAPER DOCUMENT | LICENSE | DRAWING | PRESENTA-TION MATERIAL | ANSWER SHEET | RECEIPT |
|---|---|---|---|---|---|---|---|---|
| RECOMMEND-ED SETTING | DENSITY ADJUSTMENT+1 CHARACTER | PHOTOGRAPH FULL COLOR | BACKGROUND COLOR REMOVAL+3 FULL COLOR | CHARACTER/ PHOTOGRAPH SHARPNESS+1 FULL COLOR | CHARACTER SHARPNESS+1 GRAYSCALE | CHARACTER/ PHOTOGRAPH | CHARACTERS FULL COLOR | CHARACTERS SHARPNESS+1 BLACK AND WHITE BINARY |

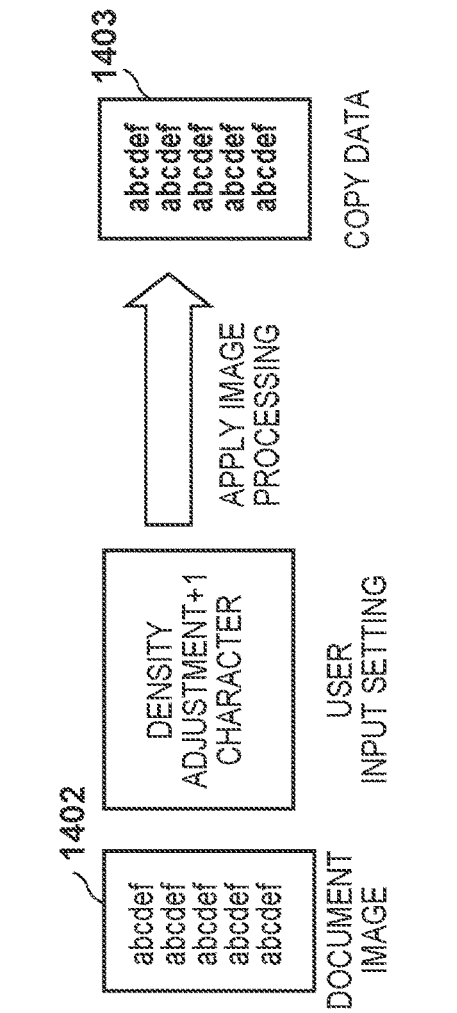

FIG. 17A

RECOMMENDED SETTING FOR CURRENTLY SCANNED IMAGES IS AS FOLLOWS

FIRST SHEET, SECOND SHEET, THIRD SHEET, FOURTH SHEET, FIFTH SHEET

DENSITY ADJUSTMENT+1
CHARACTERS
300x300dpi

IS FILE GENERATED WITH RECOMMENDED SETTING?

PERFORM FILE GENERATION WITH RECOMMENDED SETTING

PERFORM FILE GENERATION WITH INPUT SETTING

FIG. 17B

RECOMMENDED SETTING FOR CURRENTLY SCANNED IMAGES IS AS FOLLOWS

SIXTH SHEET, SEVENTH SHEET, EIGHTH SHEET, NINTH SHEET, TENTH SHEET

PHOTOGRAPH
200x200dpi
FULL COLOR

IS FILE GENERATED WITH RECOMMENDED SETTING?

PERFORM FILE GENERATION WITH RECOMMENDED SETTING

PERFORM FILE GENERATION WITH INPUT SETTING

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

There is an existing Multi Function Peripheral (hereinafter, MFP) that reads an image of an original document and performs printing based on generated image data or transmission of the generated image data. When generating image data by the MFP as described above, a user can change setting items that are displayed on a user interface (hereinafter, UI) installed in the MFP to perform printing or transmission. Examples of the setting item include such a setting item for image processing that changes brightness or color tone.

In Japanese Patent Laid-Open No. 2008-282204, in accordance with an analysis result of image data to be subjected to image processing, a UI for changing a selected setting item is displayed. However, in a case where the user has poor operational experience of the MFP, or in a case where the user does not have knowledge of the image processing, since the setting items displayed on the UI cannot be appropriately set, there is a problem in that the user cannot obtain a desired image data.

SUMMARY OF THE INVENTION

An aspect of the present invention is to eliminate the above-mentioned problem with conventional technology.

A feature of the present invention is to provide a technique that can reduce a load on a user to set a setting item, and that can provide a printed matter desired by a user even for a user with poor knowledge of image processing.

According to a first aspect of the present invention, there is provided an image processing apparatus comprising: at least one processor and at least one memory configured to function as: a holding unit that holds a type of image data and a setting item of image processing corresponding to the type in association with each other; an operation unit that is operable to cause a user to input the setting item; an obtaining unit that obtains, by applying a learned learning model to image data which are input, a result of classifying the image data into the type; and a presentation unit that presents, based on the setting item input by the operation unit and the setting item that corresponds to the type of the image data obtained by the obtaining unit and is held by the holding unit, a recommended setting item corresponding to the image data to the user.

According to a second aspect of the present invention, there is provided a method of controlling an image processing apparatus which holds a type of image data and a setting item of image processing corresponding to the type in association with each other, the method comprising: causing a user to input the setting item; obtaining, by applying a learned learning model to image data which is input, a result of classifying the image data into the type; and presenting, based on the setting item that is input and the setting item that corresponds to the type of the image data that is obtained, and that is held, a recommended setting item corresponding to the image data to the user.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating an example of a scan operation screen displayed on the console unit by a user pressing a "scan" button at the console unit of the MFP according to the first exemplary embodiment.

FIG. 9 is a diagram for explaining a learning image and correct answer data according to the first exemplary embodiment.

FIGS. 10A to 10C are diagrams for explaining types of the scanned image data and a change item of a scan setting corresponding thereto in the MFP according to the first exemplary embodiment.

FIGS. 14A and 14B are diagrams for explaining types of the scanned image data and a change item of a copy setting corresponding thereto in the MFP according to the second exemplary embodiment.

FIGS. 17A and 17B are diagrams illustrating examples of suggestion screens to be presented to a user in the MFP according to the third exemplary embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In embodiments described below, in a case where a user uses an MFP to scan a paper document, using the MFP that creates an electronic document using image data (scanned image data) obtained by the scanning as an example, an example of an image processing apparatus according to the present invention will be described.

First Exemplary Embodiment

Figure 1:
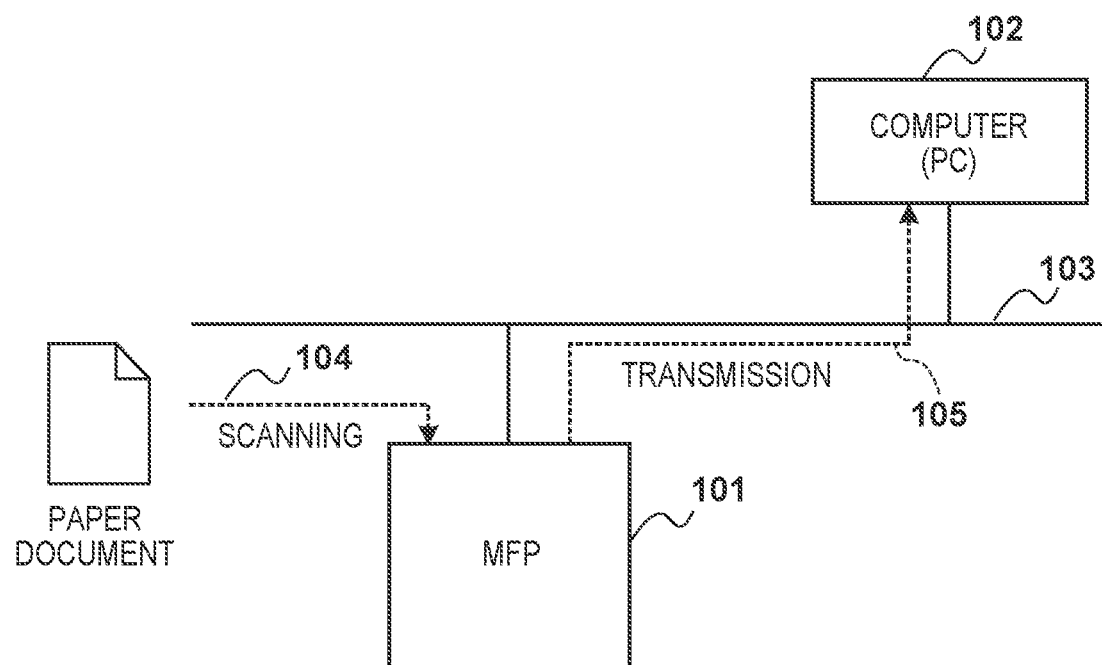
FIG. 1 depicts a schematic view illustrating a configuration of an image processing system according to a first exemplary embodiment of the present invention.

FIG. 1 depicts a schematic view illustrating a configuration of an image processing system according to a first exemplary embodiment of the present invention.

In this image processing system, a multi-function peripheral (hereinafter, MFP) 101 and a computer (hereinafter, PC) 102 are connected via a network 103. In the diagram, dotted lines 104 and 105 indicate the flow of processing, and the dotted line 104 indicates processing in which a user uses a scanner of the MFP 101 and causes it to read a paper document. At this time, the user operates a console unit (203 in FIG. 2) of the MFP 101 to be described later, and can perform various settings related to a destination (for instance, the PC 102) to which scanned image data is transmitted, scanning, and transmission. As the various settings, the user can designate a resolution, a compression ratio, a data format (for instance, JPEG, TIFF, PDF, color compression of small number of colors, color compression of small number of colors (with OCR result)), and the like. The dotted line 105 indicates processing for, based on the designated various settings, generating image data by using a software or hardware function of the MFP 101 and transmitting the image data to the designated destination. Here, the image data transmitted to the PC 102 is transmitted in a file format such as PDF, and thus can be viewed with a general-purpose viewer included in the PC 102.

Figure 2:
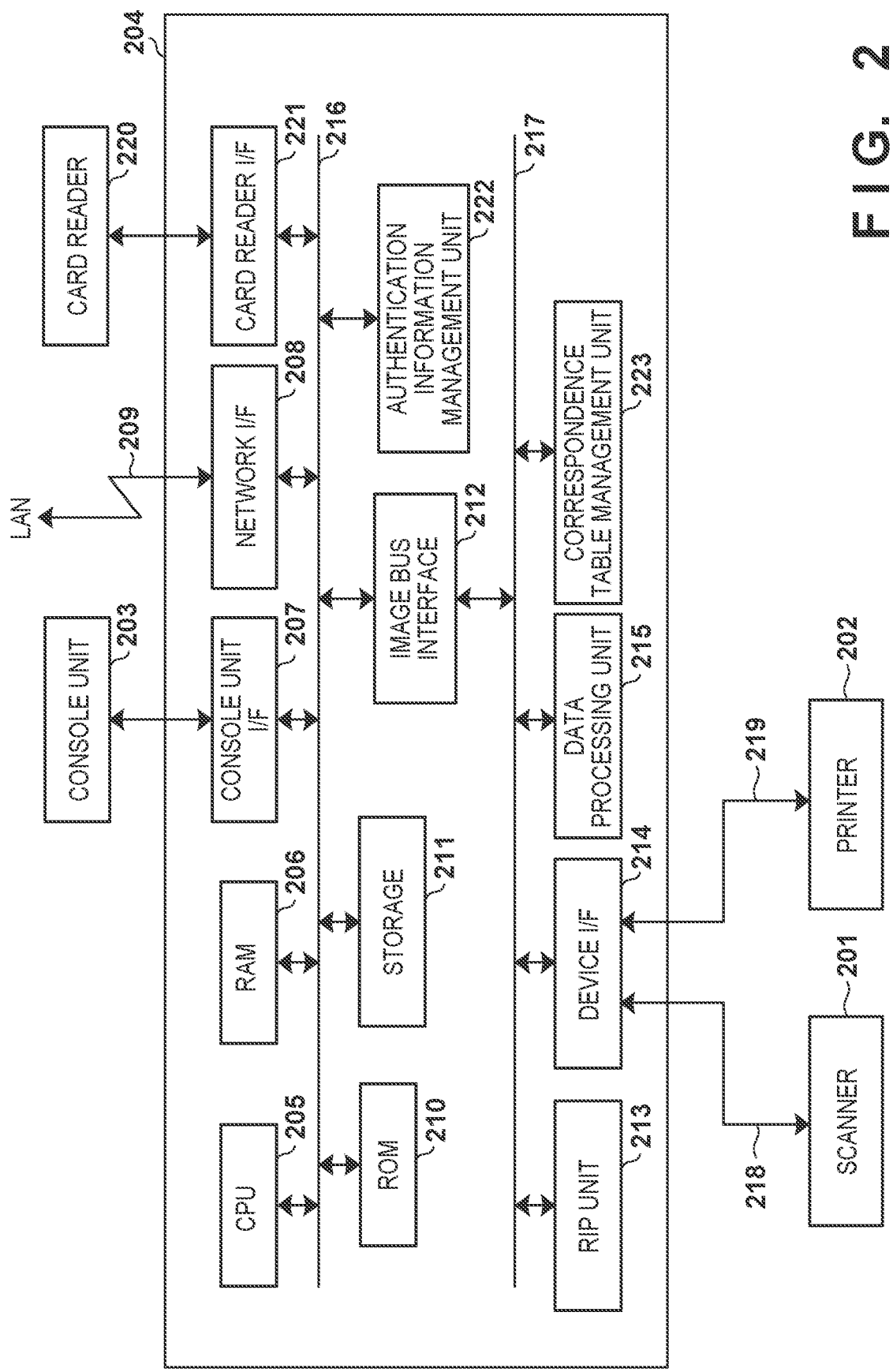
FIG. 2 is a block diagram for explaining a hardware configuration of an MFP according to the first exemplary embodiment.

FIG. 2 is a block diagram for explaining a hardware configuration of the MFP 101 according to the first exemplary embodiment.

The MFP 101 has a scanner 201 which is an image input device, and a printer 202 which is an image output device, a control unit 204 having a memory and the like, a console unit 203 which is a user interface, a card reader 220 which performs user authentication for using the MFP, and the like. The control unit 204 is a controller for performing input/output of image information and device information by connecting to the scanner 201, the printer 202, and the console unit 203 while simultaneously connecting to a LAN 209. A CPU 205 is a processor that controls the system as a whole. A RAM 206 provides a system work memory for operation of the CPU 205, and also provides an image memory for temporarily storing image data. A ROM 210 is a boot ROM, and programs such as a boot program of the system are stored. A storage 211 is constituted of, for instance, a hard disk drive or the like, and stores system control software, image data, and the like. A console unit I/F 207 is an interface unit with the console unit (UI) 203, and outputs image data to be displayed on the console unit 203 to the console unit 203. Furthermore, the console unit I/F 207 plays a role of transmitting information input by the user from the console unit 203 to the CPU 205. A network I/F 208 connects the MFP 101 to the LAN 209 and performs input/output of packet form information through the LAN 209. A card reader I/F 221 is an interface unit with the card reader 220, and plays a role of transmitting information read by the card reader 220 to an authentication information management unit 222. The devices described above are arranged on a system bus 216. An image bus interface 212 is a bus bridge that connects the system bus 216 and an image bus 217 that transfers image data at high speed to each other and converts the data structure. The image bus 217 is constituted of, for instance, a PCI bus or IEEE 1394.

Devices as described below are arranged on the image bus 217. A raster image processor (RIP) unit 213 achieves so-called rendering processing that analyzes a page description language (PDL) code and deploys into a bitmap image of a designated resolution. A device I/F 214 connects to the scanner 201 through a signal line 218 and connects to the printer 202 through a signal line 219, and performs synchronous/asynchronous conversion of image data. A data processing unit 215 performs, at the time of scanning operation, on scanned data input from the scanner 201, image processing, and processing such as JPEG compression or OCR. With this, scanned image data are generated. Furthermore, the data processing unit 215 performs, at the time of printing operation, image processing of print image data that is output to the printer 202. The scanned image data generated at the time of scanning operation is transmitted through the network I/F 208 and the LAN 209 to the designated destination (for instance, the client PC 102). Furthermore, the data processing unit 215 can also perform decompression of the compressed data received through the network I/F 208 and the LAN 209. The decompressed image data is transmitted to the printer 202 through the device I/F 214 and printing is performed. A correspondence table management unit 223 manages a correspondence table 1001 that stores a classification result of a learned model (learning model) of FIGS. 10A-10C, described later, and a recommended setting corresponding thereto in association with each other. Note that this management may be performed by being associated with an authenticated user.

Figure 3:
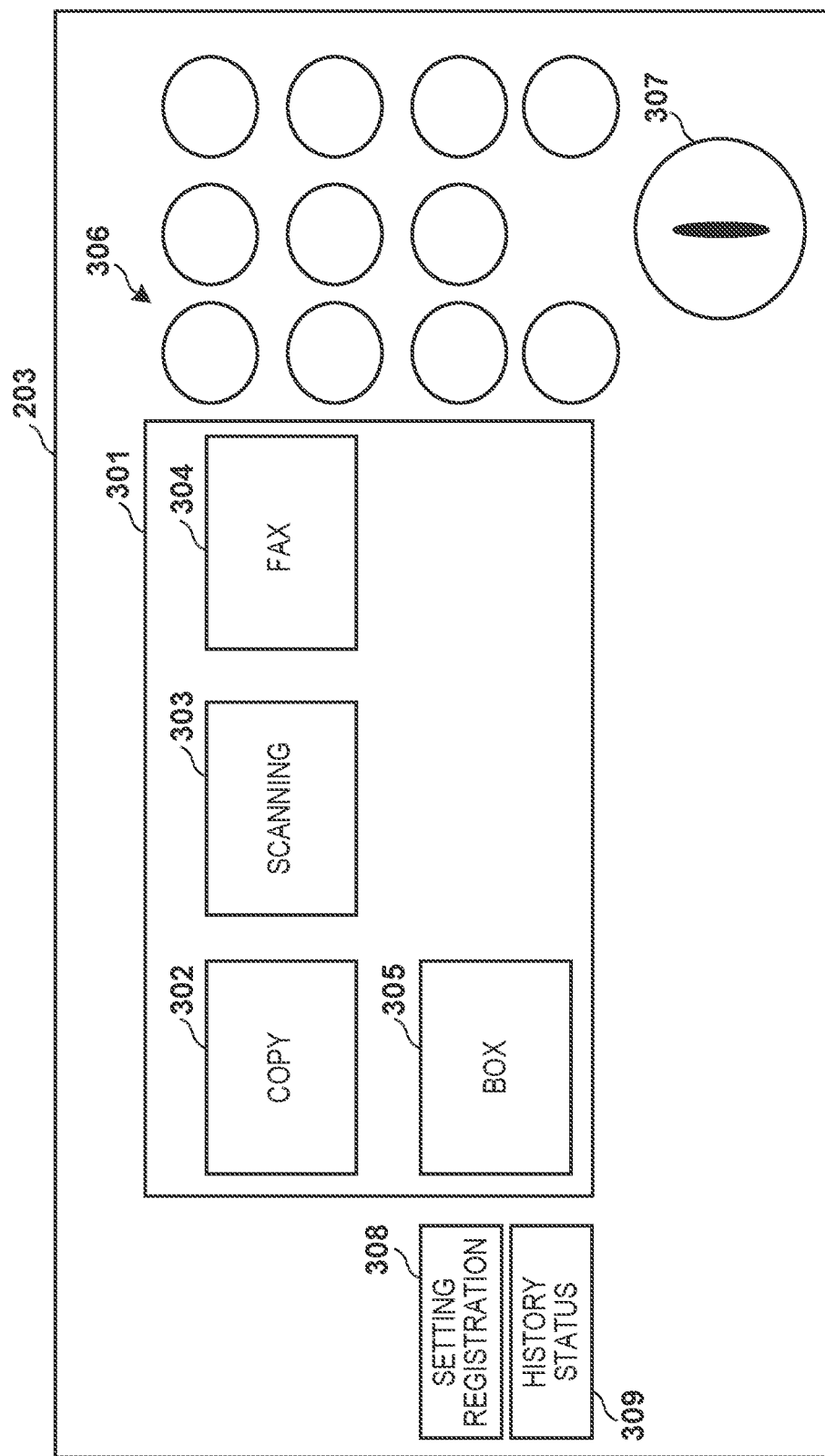
FIG. 3 is a diagram illustrating an example of a console unit of the MFP according to the first exemplary embodiment and a home screen displayed thereon.

FIG. 3 is a diagram illustrating an example of the console unit 203 of the MFP 101 according to the first exemplary embodiment and a home screen displayed thereon.

A window 301 displays application selection buttons each of which calls an appropriate operation screen in accordance with a user instruction. In FIG. 3, a "copy" button 302, a "scan" button 303, a "fax" button 304, and a "box" button 305 are displayed that respectively call operation screens of a copy function, a network scanning function, a fax function, and a box function. Furthermore, on the console unit 203, a numeric keypad 306, and a start key 307 for instructing start of a job are arranged. In addition, a "setting registration" button 308 for calling a setting registration screen of the apparatus and a "history status" button 309 for calling a job history status screen are also arranged.

FIG. 4 is a diagram illustrating an example of a scan operation screen displayed on the console unit 203 by a user pressing the "scan" button 303 at the console unit 203 of the MFP 101 according to the first exemplary embodiment.

In this diagram, a user can designate a destination by pressing one destination input button among "address book", "one-touch", and "new destination" of a region 401. Furthermore, a "transmit email to self" button 402 for setting an e-mail address tied to a user is also displayed. A transmission settings button 403 is used to set transmission settings such as a resolution, a color mode, size, file designation of scanned data. An advanced functions button 404 is a button for calling various detailed settings at the time of reading and transmission.

FIGS. 5A to 5D are diagrams illustrating screen examples displayed on the console unit 203 of the MFP 101 according to the first exemplary embodiment.

Figure 5A:
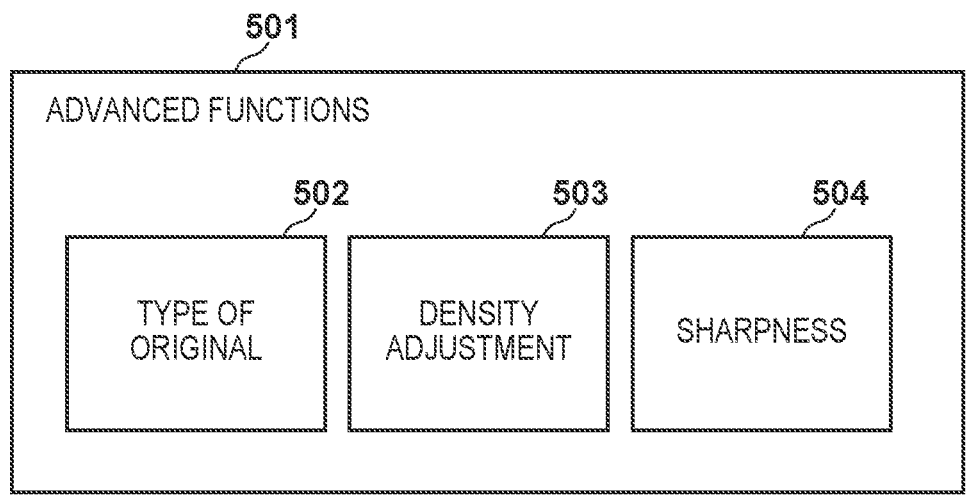
FIGS. 5A to 5D are diagrams illustrating screen examples displayed on the console unit of the MFP according to the first exemplary embodiment.
Figure 5B:
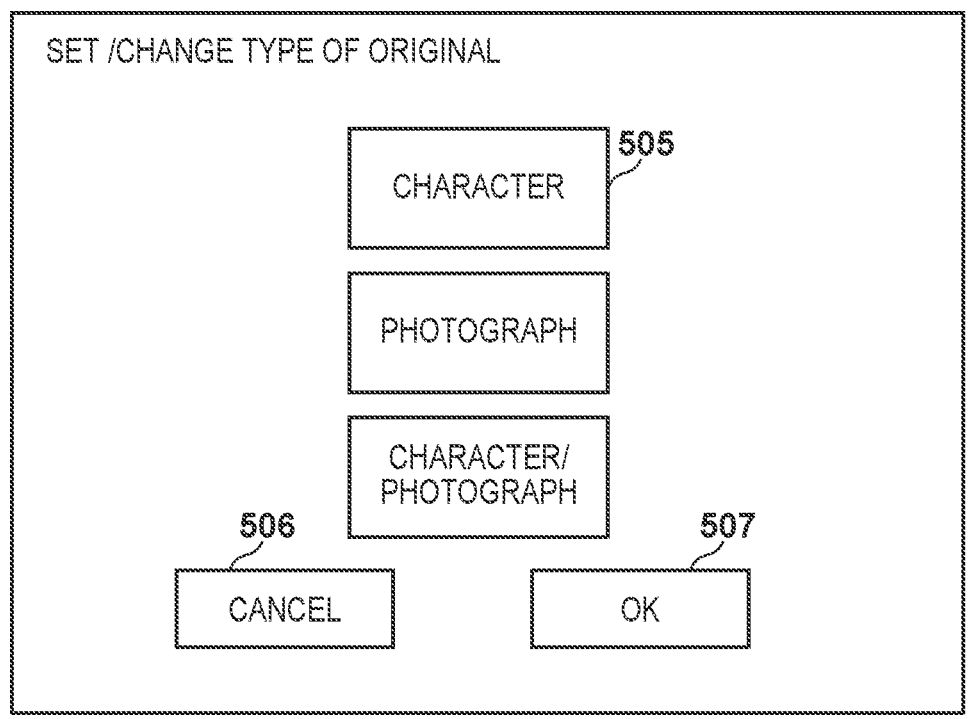

FIG. 5A illustrates an example of an advanced functions screen 501 displayed on the console unit 203 by a user pressing the "advanced functions" button 404. On the advanced functions screen 501, in the first exemplary embodiment, a "type of original" button 502, a "density adjustment" button 503, and a "sharpness" button 504 are displayed. Here, when the user presses the "type of original" button 502, a "type of original" setting change screen in FIG. 5B is displayed on the console unit 203.

On this "type of original" setting change screen, "character", "photograph", and "character/photograph" buttons are displayed. In the first exemplary embodiment, when a "character" button 505 is selected, such filtering processing where the sharpness of the whole image is improved is applied to the scanned image data. Furthermore, when the "photograph" button is selected, such filtering processing where the sharpness of the whole image is deteriorated is applied to the scanned image data. Furthermore, when the "character/photograph" button is selected, filtering processing where the sharpness of the whole image is slightly improved is applied to the scanned image data. The user selects any one of the buttons and presses an OK button 507, whereby a setting change is applied. Furthermore, by pressing a cancel button 506, it is possible to cancel the setting change by this screen.

Figure 5C:
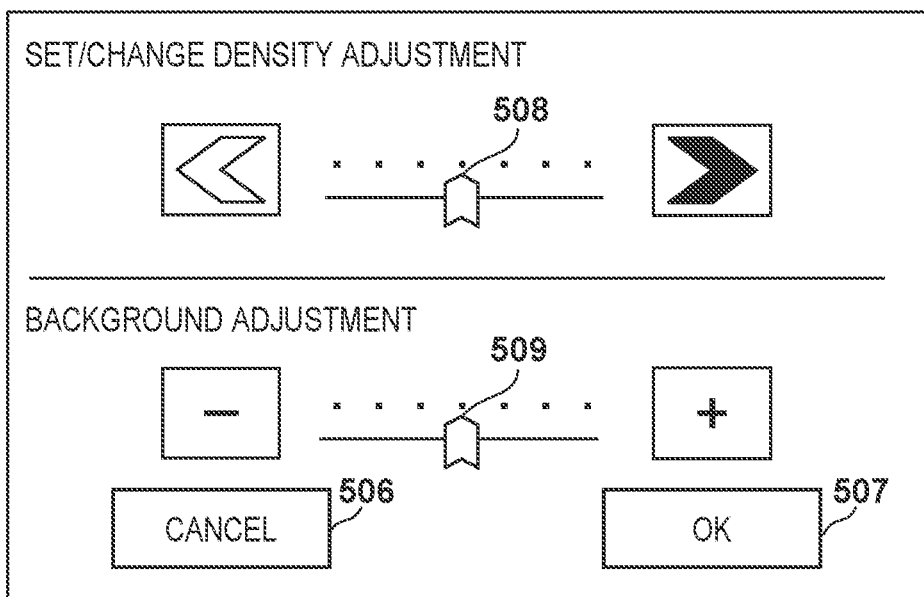

Furthermore, on the screen in FIG. 5A, when the user presses the "density adjustment" button 503, a "density adjustment/background adjustment" setting change screen in FIG. 5C is displayed on the console unit 203.

On this "density adjustment/background adjustment" setting change screen, a density adjustment slider 508 and a background adjustment slider 509 are displayed. For instance, when the density adjustment slider 508 is moved in the leftward direction, the processed image is brightened, and when the slider 508 is moved in the rightward direction, the processed image is darkened. Furthermore, for instance, when the background adjustment slider 509 is moved in the leftward direction, the background color of a paper document is emphasized in the processed image, and when the slider 509 is moved in the rightward direction, the background color of the paper document is processed to a highlight side in the processed image. Furthermore, the cancel button 506 and the OK button 507 displayed on the "density adjustment/background adjustment" setting change screen respectively have functions similar to the buttons displayed on the screen in FIG. 5B.

Figure 5D:
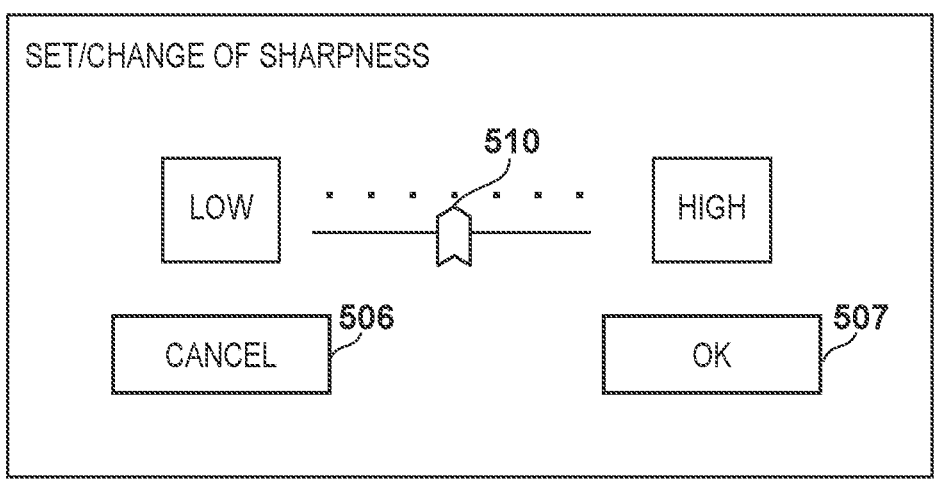

Furthermore, on the screen in FIG. 5A, when the user presses the "sharpness" button 504, a "sharpness" setting change screen in FIG. 5D is displayed on the console unit 203.

On the "sharpness" setting change screen, a sharpness adjustment slider 510 is displayed, and for instance, when the slider 510 is moved in the leftward direction, the sharpness of the processed image is lowered, and when the slider 510 is moved in the rightward direction, the sharpness of the processed image is heightened. Furthermore, the "cancel" button 506 and the "OK" button 507 displayed on the "sharpness" setting change screen respectively have functions similar to the buttons displayed on the screen in FIG. 5B.

Figure 6:
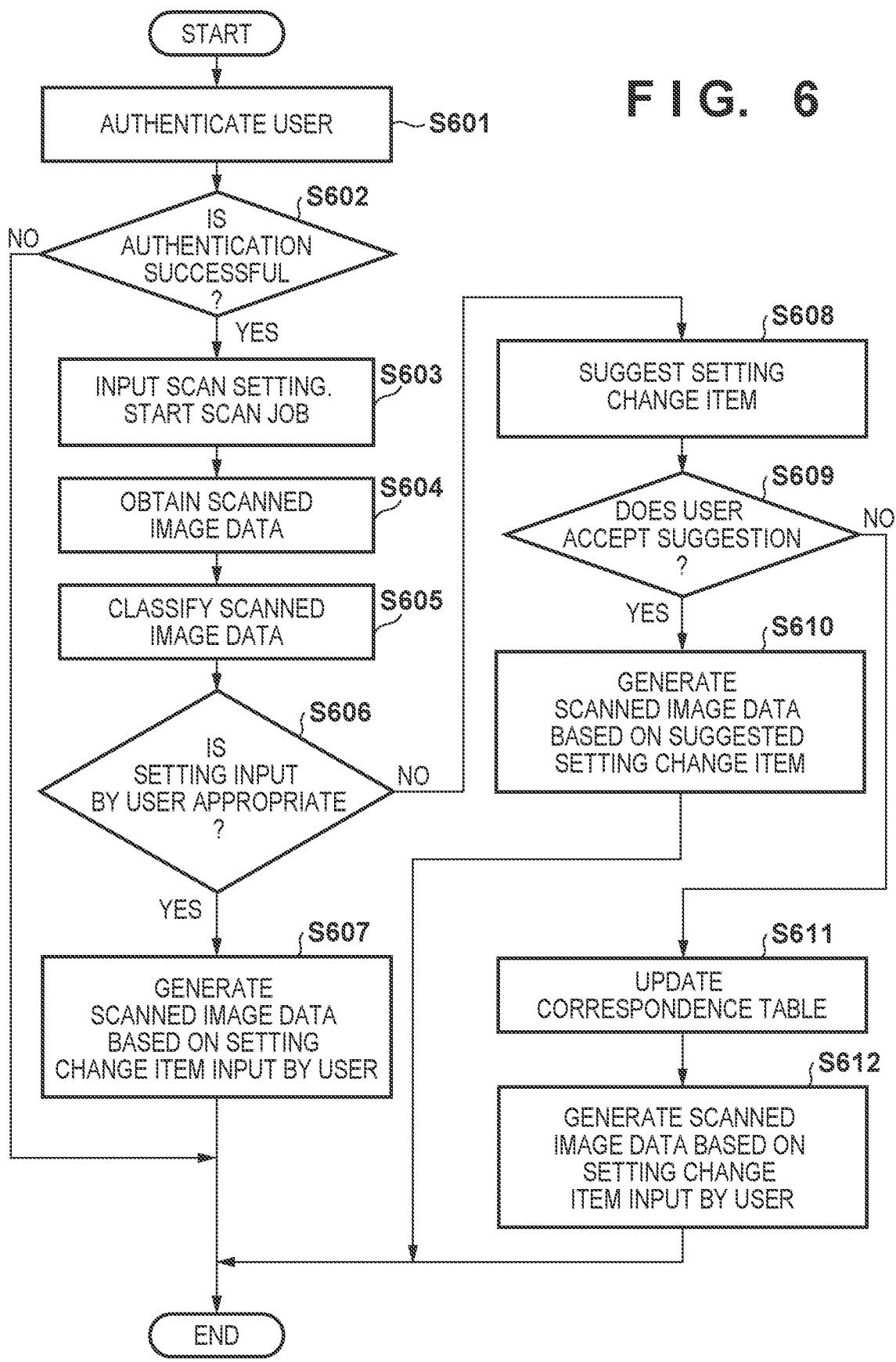
FIG. 6 is a flowchart for explaining processing of scanning a paper document and obtaining scanned image data, in the MFP according to the first exemplary embodiment.

FIG. 6 is a flowchart for explaining processing of scanning a paper document and obtaining scanned image data, in the MFP 101 according to the first exemplary embodiment. Note that the processing described in this flowchart is achieved by the CPU 205 deploying the control program stored in the storage 211 to the RAM 206 and executing the program.

This processing is started by the "scan" button 303 being pressed on the screen in FIG. 3. First, in step S601, a user holds a card for user authentication over the card reader 220 or inputs a user name and password on a user authentication screen displayed on the console unit 203, whereby the CPU 205 performs user authentication by using the authentication information management unit 222. Note that this user authentication may be performed by the CPU 205 executing a program without using the authentication information management unit 222. Next, the process proceeds to step S602, the CPU 205 determines whether or not the user authentication is successful. Here, in a case where the authentication is successful, the process proceeds to step S603, otherwise this process is terminated.

In step S603, for instance, the CPU 205 displays the scan operation screen in FIG. 4, and further accepts input of a scan setting and a destination input via the advanced functions screens in FIGS. 5A to 5D. Then, when the start key 307 arranged on the console unit 203 is pressed, the CPU 205 starts a scan job. Then, the process proceeds to step S604, when the scan job is started, the CPU 205 controls the scanner 201 to scan a paper document, and scanned image data is delivered to the data processing unit 215 through the device I/F 214 and the image bus 217.

Next, the process proceeds to step S605, the CPU 205 uses the data processing unit 215 and performs classification on the scanned image data by using a learned model.

Figure 7A:
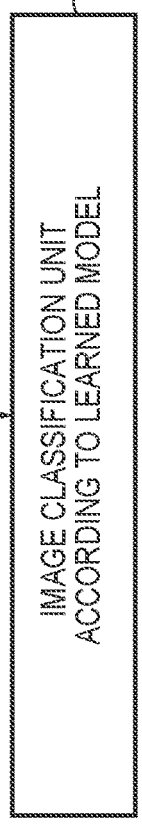
FIGS. 7A and 7B are diagrams illustrating an example in which classification processing of the scanned image data in step S605 is performed by using a learned model.
Figure 7B:
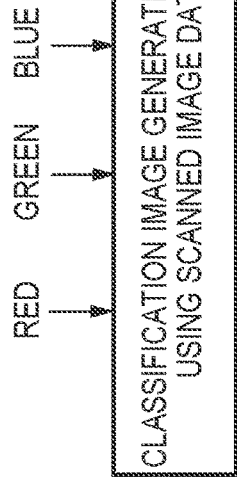

FIGS. 7A and 7B are diagrams illustrating an example in which classification processing of the scanned image data in step S605 is performed by using a learned model.

Furthermore, the description is given by assuming that the CPU 205 executes the program deployed to the RAM 206 and achieves each process described below. The description is given by assuming that, while also appropriately saving to the RAM 206 and loading from the RAM 206 the scanned image data obtained by the scanner 201 and intermediate generation data of each process, the CPU 205 performs computation processing.

In FIG. 7A, in the first exemplary embodiment, a classification image generation unit 701 using scanned image data receives scanned image data obtained by the scanner 201 and expressed by RGB. Next, the classification image generation unit 701 uses the received image data and generates image data for being input to an image classification unit 702 according to a learned model to be described later. For instance, in a case where the input image of the image classification unit 702 according to the learned model is RGB image data with size of 256×256, the scanned image data is reduced in accordance with the input image size. Note that the reduction method uses a known technology.

Hereinafter, the configuration of the image classification unit 702 according to the learned model will be described.

Figure 8:
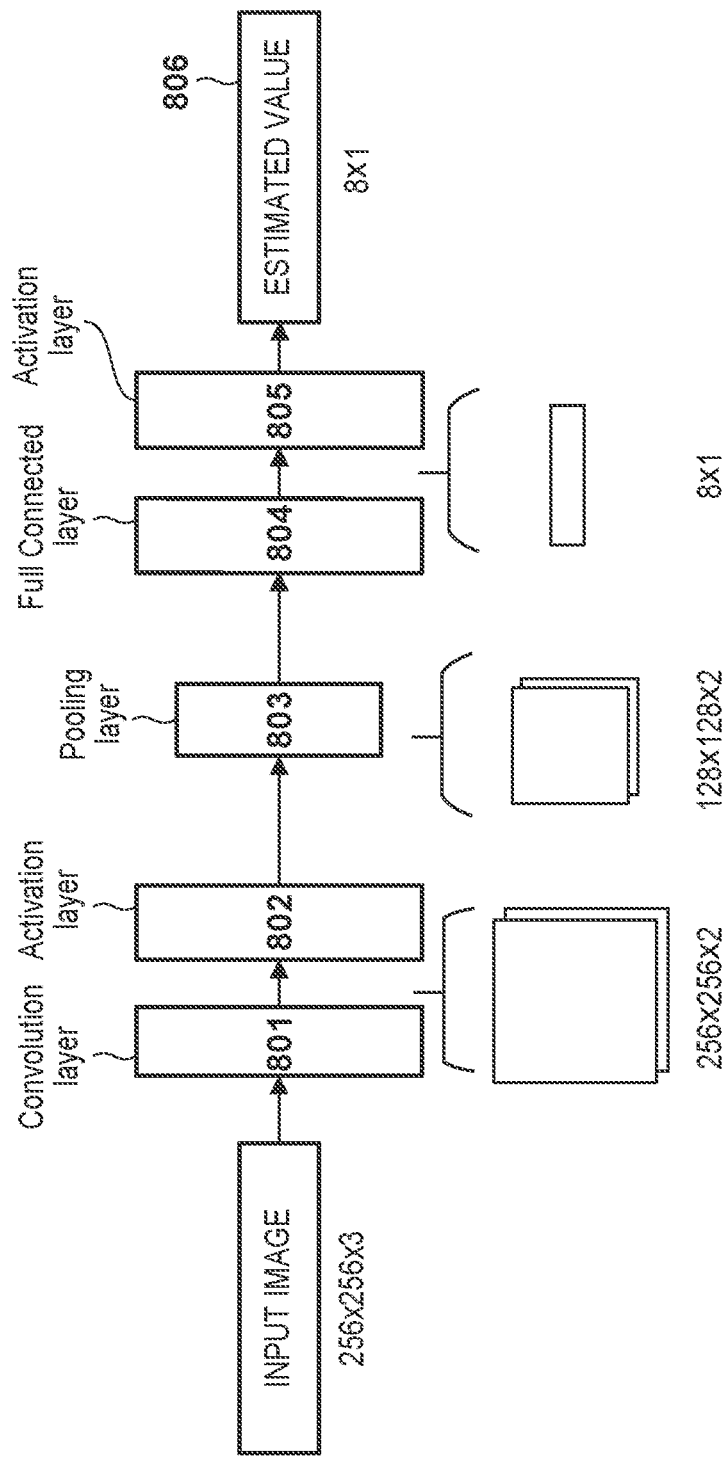
FIG. 8 is a diagram illustrating a configuration example of a neural network in an image classification unit according to the learned model.

FIG. 8 is a diagram illustrating a configuration example of a neural network in the image classification unit 702 according to the learned model. The operation of the first exemplary embodiment will be described below based on the neural network illustrated in FIG. 8, but the technology according to the present invention is not limited thereto. For instance, a neural network having a deeper layer may be used, or a form of U-net may be used. In addition, in the first exemplary embodiment, RGB image data of 256×256 is used as input data, but the present invention is not limited thereto.

First, in a Convolution Layer 801, a convolution operation is performed on the input image data input to the image classification unit 702 according to the learned model. When the pixel value of an (x, y) position of the input image data is assumed to be I(x, y), output image data IG1(x, y, p) of the Convolution Layer 801 is calculated by Equation described below.

$$IG1(x,y,p)=\Sigma_{s=-1}^{s=1}\Sigma_{t=-1}^{t=1}\Sigma_{z=1}^{z=3} Wstpz^{G1} I(x+s,y+t,z) \quad (1)$$

Here, p is the number of output planes, and p=2 is used in the first exemplary embodiment. Note that the number of output planes is merely an example and is not limited thereto.

In addition, $Wstpz^{G1}$ is a weight in the Convolution Layer 801 held by the neural network, and has a different value for each combination of s, t, and p. Note that, in I(x+s, y+t) in the above Equation, in a case where a reference location is outside a pixel location of the input image data (for instance, I(−1, −1), or the like), the computation is performed by taking the pixel value as "0". By the above computation, the output of the Convolution Layer 801 is image data of 256×256×2.

Next, in an Activation Layer 802, a non-linear function is applied to the output image data IG1(x, y, p) of the Convolution Layer 801. More specifically, output image data IG2(x, y, p) of the Activation Layer 802 is calculated by using a ramp function by Equation (2) descried below.

$$IG2(x,y,p)=\max(0,IG1(x,y,p)) \quad \text{Equation (2)}$$

Note that the non-linear function applied in the processing is not limited thereto. For instance, a hyperbolic tangent function and the like may be used. By the above computation, the output image data IG2(x, y, p) of the Activation Layer 802 becomes image data of 256×256×2, that is, image data including two planes of 256×256 image data.

Next, compression of information is performed in a Pooling Layer 803. Here, by performing 2×2 max pooling, reduction of the output image data IG2(x, y, p) is performed. More specifically, output image data IG3(u, v, p) of the Pooling Layer 803 is calculated by Equation (3) described below.

$$IG3(u,v,p)=\max(IG2(2u,2v,p),IG2(2u,2v+1,p),IG2(2u+1,2v,p),IG2(2u+1,2v+1,p)) \quad \text{Equation (3)}$$

Note that the ranges of u and v are 0≤u≤127, 0≤v≤127, respectively. By the above computation, the output image data IG3(u, v, p) of the Pooling Layer 803 becomes image data of 128×128×2.

Next, a Full Connected Layer 804 calculates a matrix A of 1×8 from the output image data IG3(u, v, p) of the Pooling Layer 803. The matrix A output by the Full Connected Layer 804 is calculated by Equation (4) described below.

$$A=\Sigma_{u=1}^{u=127}\Sigma_{v=1}^{v=127}\Sigma_{p=1}^{p=2} Wuvp^{G4} IG3(u,v,p) \quad \text{Equation (4)}$$

Note that $Wuvp^{G4}$ is here a weight held by the neural network.

Finally, an Activation Layer 805 applies non-linear processing to the "a" value and outputs the determination result. Here, by applying a softmax function, $$S(Ai) = \frac{e^{Ai}}{\sum_{n=1}^{n=8} e^{Ai}} \quad \text{Equation (5)}$$

It is possible to obtain such a 1×8 matrix S (806) that each element in matrix A is made to be in a value range [0, 1] and the sum of the respective elements becomes "1".

Here, i may take a value from 1 to 8.

Next, a technique for obtaining a classification result of an image using the estimated value matrix 806 will be described with reference to FIG. 7B.

For instance, as the result of inputting scanned image data formed only of a document such as a document image 703 as an input image of the learned model in FIG. 8, it is assumed that the values of the respective elements of the estimation matrix 806 are respectively obtained as values indicated by a reference numeral 704. In this case, a first arrangement 705 has the maximum value. Next, in a correspondence table 706 of the arrangement and the image type, a type corresponding to the first arrangement having the maximum value is a "document image" 707. In this manner, as the classification result of the scanned image data, the "document image" is obtained.

This concludes the explanation of the image classification unit 702 according to the learned model in FIG. 7A.

Next, training data and correct answer data according to the first exemplary embodiment will be described with reference to FIG. 9. The training data in the first exemplary embodiment is generated from image data printed on a recording medium (paper or the like).

FIG. 9 is a diagram explaining a training image and the correct answer data according to the first exemplary embodiment.

A reference numeral 901 indicates, as a result of visually classifying an arbitrary image group beforehand into eight types of a "document image", a "photograph", a "recycled paper document", a "license", a "drawing", a "presentation material", an "answer sheet", and a "receipt", an image group determined to be the document image. Furthermore, reference numerals 903, 905, 907, 909, 911, 913, and 915 each also indicate an image group that is classified in the same manner. Additionally, matrices 902, 904, 906, 908, 910, 912, 914, and 916 are each constituted of a matrix of 1×8. In the matrix 902, the value of the first arrangement is set to "1" and the values of the other arrangements are each set to "0". In the same manner, the values of the second arrangement of the matrix 904, the third arrangement of the matrix 906, the fourth arrangement of the matrix 908, the fifth arrangement of the matrix 910, the sixth arrangement of the matrix 912, the seventh arrangement of the matrix 914, and the eighth arrangement of the matrix 916 are set to "1", and the values of the other arrangements of the matrices are all set to "0".

Here, by using the document image 901 as the training data and the matrix 902 as the correct answer data, the neural network illustrated in FIG. 8 is made to learn. Similarly, also by using the image 903 and the matrix 904, the image 905 and the matrix 906, the image 907 and the matrix 908, the image 909 and the matrix 910, the image 911 and the matrix 912, the image 913 and the matrix 914, and the image 915 and the matrix 916, the learning is performed.

Then, returning to FIG. 6, in step S606, based on the classified type of the scanned image data and the correspondence table of recommended setting to be described later, the CPU 205 determines whether or not a setting item input by a user is appropriate. This determination method will be described with reference to FIGS. 10A to 10C.

Figure 10B:
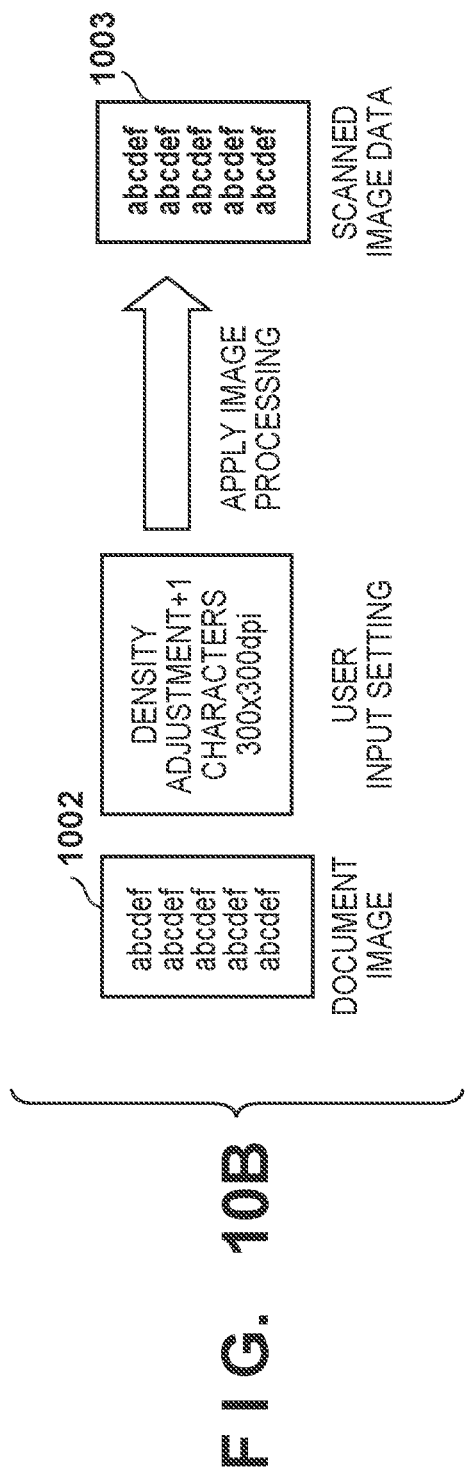
Figure 10C:
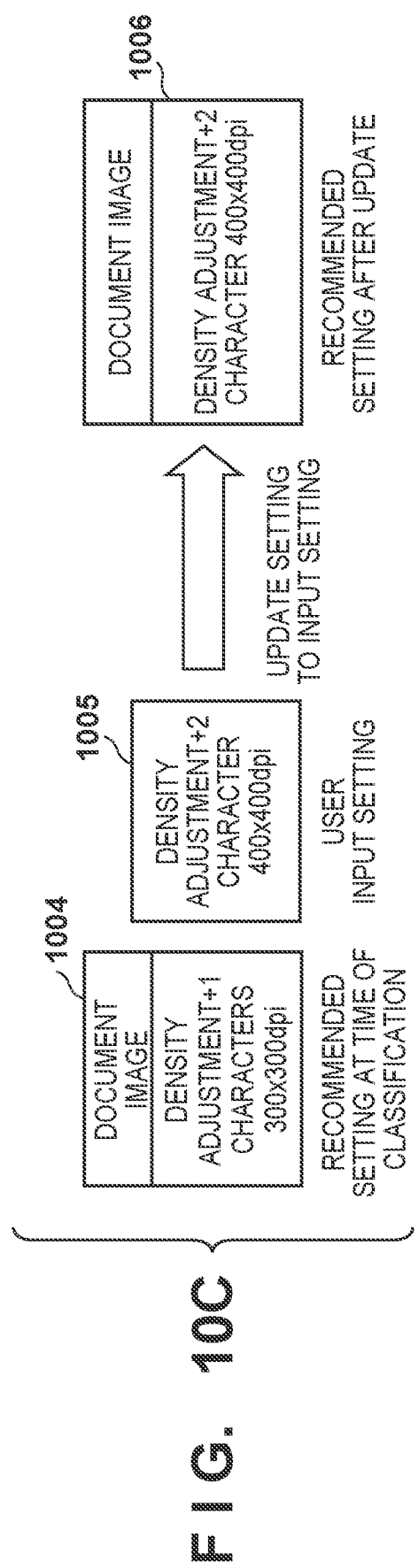

FIGS. 10A to 10C are diagrams for explaining types of the scanned image data and a scan setting item corresponding thereto in the MFP 101 according to the first exemplary embodiment.

FIG. 10A illustrates the correspondence table 1001 representing a classification result of the learned model and a recommended setting corresponding thereto. Here, for instance, in a case where the scanned image data is classified by the learned model into the "document image", the setting items described in the "recommended setting" of the correspondence table 1001 are "density adjustment+1", "character mode", and "300×300 dpi". These setting items are items that can be set and changed by user operation via the scan operation screen in FIG. 4 and the advanced functions screen in FIGS. 5A to 5D. Then, in step S606, the CPU 205 determines whether or not this recommended setting and the setting item input via the console unit 203 by the user match with each other. Here, in a case where it is determined that the two match with each other, it is determined that the setting item input by the user is appropriate, and the process proceeds to step S607, but otherwise proceeds to step S608. In step S607, the CPU 205 executes image processing based on the setting item input by the user through the console unit 203 at the data processing unit 215, and the process is terminated. A method for generating scanned data based on the setting item here will be described with reference to FIG. 10B.

For instance, it is assumed that, for a document image 1002, the user selects "300×300 dpi" in the transmission settings button 403 in FIG. 4, selects the "character" button 505 in FIG. 5B, and moves the density adjustment slider 508 in FIG. 5C by one stage in the rightward direction. In this case, for instance, the scanner 201 first scans the paper document at 300×300 dpi and creates scanned image data. Next, since the "character" button 505 is selected, filtering processing for improving sharpness is applied to the whole image. Next, since the density adjustment slider 508 is moved by one stage in the rightward direction, for instance, the RGB signal value of the whole image is reduced by "10". By the processing described above, scanned image data 1003 is generated.

On the other hand, in a case where the setting item input by the user is not appropriate, the process proceeds to step S608. In step S608, the CPU 205 presents, to the console unit 203, a suggestion whether or not to execute image processing with the recommended setting based on the classification result of the learned model and the correspondence table 1001 representing the recommended setting corresponding thereto illustrated in FIG. 10A.

Figure 11:
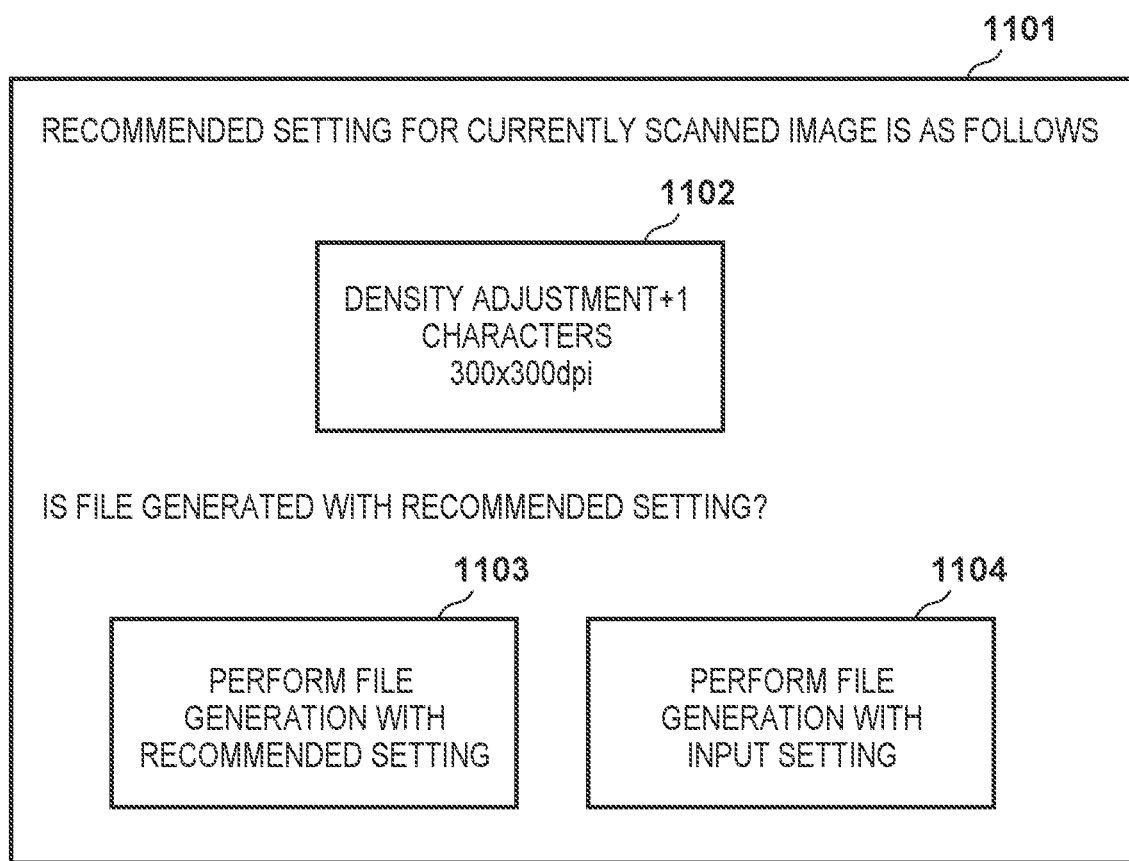
FIG. 11 is a diagram illustrating an example of a suggestion screen to be presented to a user in step S608 in the MFP according to the first exemplary embodiment.

FIG. 11 is a diagram illustrating an example of a suggestion screen 1101 to be presented to the user in step S608 in the MFP 101 according to the first exemplary embodiment.

Here, a recommended setting item 1102 is displayed based on the result of classifying the scanned image data with the learned model in FIG. 8 and the correspondence table 1001 in FIG. 10A. Note that the suggestion screen 1101 is not limited thereto, and for instance, an image of scanned image data to be obtained by executing image processing with the recommended setting, a thumbnail image, for instance, or the like may be displayed on the suggestion screen 1101.

Then, the process proceeds to step S609, the CPU 205 determines whether or not a "perform file generation with recommended setting" button 1103 is pressed on this suggestion screen 1101. Here, in a case where it is determined that the "perform file generation with recommended setting" button 1103 is pressed, the process proceeds to step S610, and image processing based on the recommended setting item is executed, and the process is terminated. For instance, in a case where the result of classifying the scanned image with the learned model is the "document image" in FIG. 10A, generation of scanned data to which "density adjustment+1", "character", "300×300 dpi", which constitute a combination of the setting items corresponding thereto, are applied is executed. The details of this processing are similar to the processing described in step S607.

On the other hand, in step S609, in a case where the CPU 205 determines that a "perform file generation with input setting" button 1104 is pressed, the process proceeds to step S611. In step S611, the CPU 205 updates the correspondence table 1001 in FIG. 10A based on the setting item input by the user and the classification group when scanned image data are classified with the learned model.

A specific example is described with reference to FIG. 10C. For instance, in a case where the result of classifying the scanned image data with the learned model is the "document image" in FIG. 10A, a recommended setting corresponding thereto is indicated by 1004. Then, the recommended setting 1004 corresponding to this "document image" is updated as in a recommended item 1006 based on a setting item 1005 input by the user. The correspondence table 1001 updated in this manner may be managed by the correspondence table management unit 223 per-user basis. Note that the processing for updating is not limited to this example. For instance, the number of times the "perform file generation with input setting" button 1104 is pressed may be managed per-user basis, stored in the correspondence table management unit 223, and updated for the first time when the number of times reaches a predetermined number of times which is determined beforehand. Note that the correspondence table 1001 may be switched per-user basis in accordance with information from the authentication information management unit 222.

Subsequently, the process proceeds to step S612, in the same manner as in step S607, the CPU 205 executes generation of scanned data based on the setting item input by the user through the console unit 203 at the data processing unit 215, and the process is terminated. The details of the processing of generation of the scanned data based on the setting item here are similar to the processing described in step S607.

As described above, according to the first exemplary embodiment, the load on the user to change the setting of the image processing for the input image data can be reduced. Furthermore, even when the user has poor knowledge of the image processing, it is possible to provide scanned image data desired by the user. Further it is possible to provide a printed matter using the scanned image data.

Second Exemplary Embodiment

Next, as a second exemplary embodiment, a configuration for generating print image data at the time of copy operation will be described. Note that a hardware configuration and the like of the MFP 101 according to the second exemplary embodiment is the same as that of the first exemplary embodiment described above, and thus the descriptions thereof will be omitted.

FIGS. 12A to 12E are diagrams illustrating operation screen examples at the time of copy operation displayed on the MFP 101 according to the second exemplary embodiment.

Figure 12A:
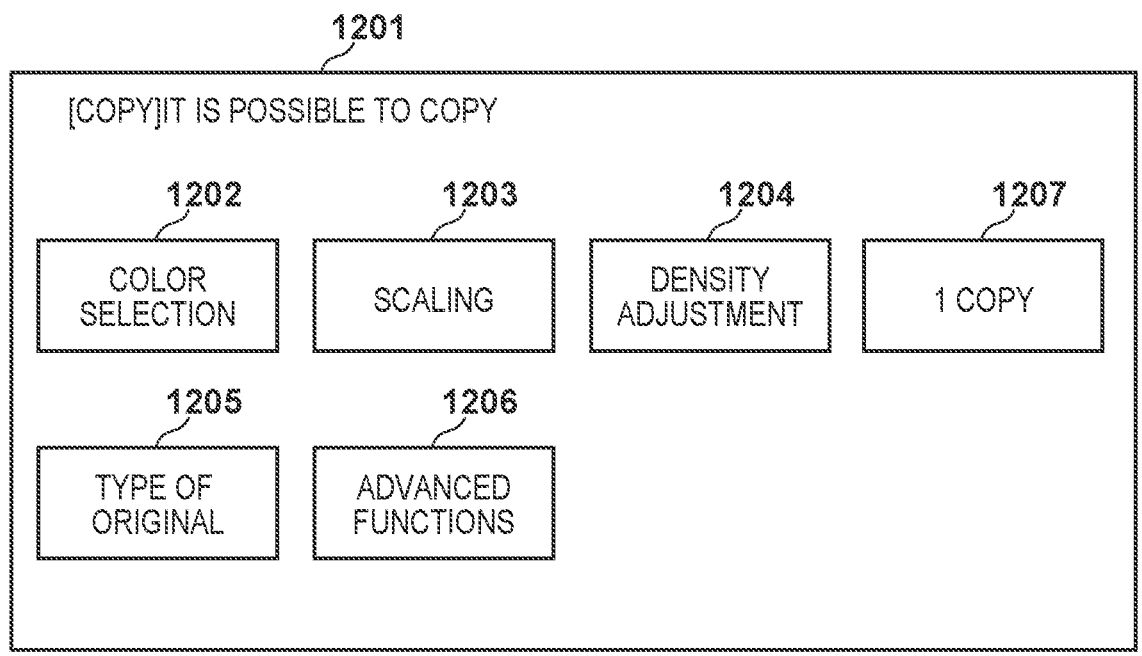
FIGS. 12A to 12E are diagrams illustrating operation screen examples at the time of copy operation displayed on an MFP according to a second exemplary embodiment.
Figure 12B:
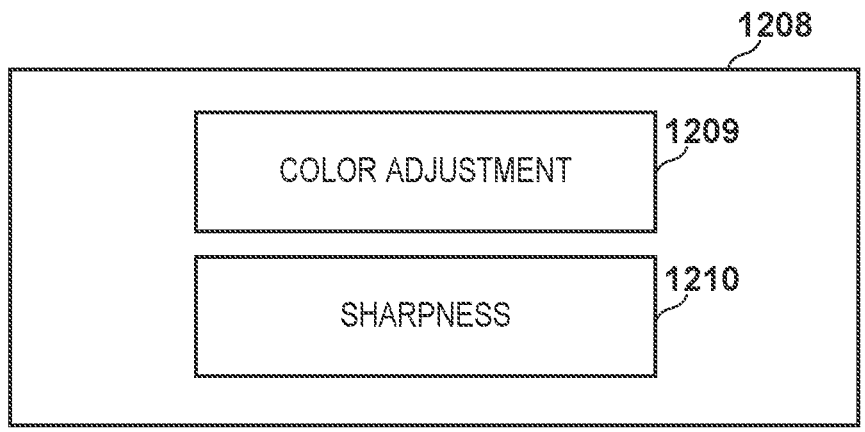
Figure 12C:
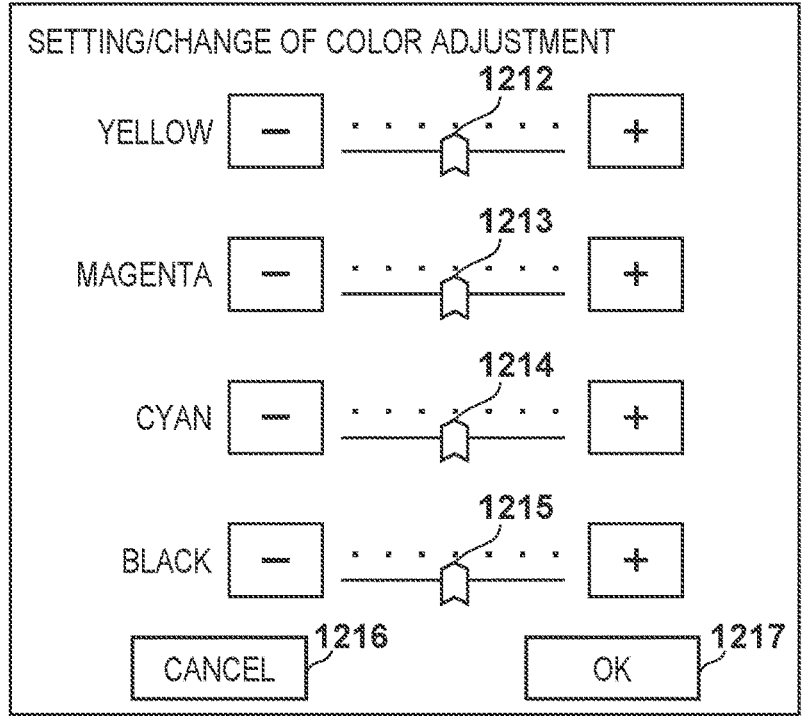
Figure 12D:
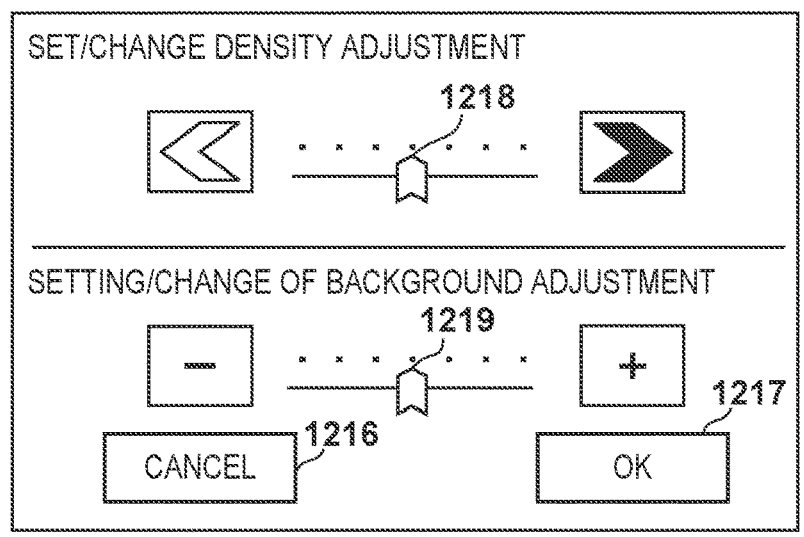

FIG. 12A illustrates an example of a copy operation screen 1201 displayed on the console unit 203 when the "copy" button 302 is pressed on the home screen of FIG. 3. In this diagram, a "color selection" button 1202 selects whether to generate print image data in an RGB image or a gray-scale image. A "scaling" button 1203 changes an enlargement magnification and a reduction magnification of the print image data. A "density adjustment" button 1204 has a function equivalent to the "density adjustment" button 503 in FIG. 5A of the first exemplary embodiment, and when the user presses it, a "density adjustment" setting change screen in FIG. 12D is displayed. A density adjustment slider 1218 in FIG. 12D has the same function as the density adjustment slider 508 of FIG. 5C. Furthermore, a background adjustment slider 1219 performs the same processing as the background adjustment slider 509 in FIG. 5C. Furthermore, a cancel button 1216 and an OK button 1217 in FIGS. 12C to 12E have the same functions as the OK button 507 and the cancel button 506 displayed on the "type of original" setting change screen in FIG. 5B.

A "type of original" button 1205 has a function equivalent to the "type of original" button 502 in FIG. 5A of the first exemplary embodiment. When the "type of original" button 1205 is pressed, the "type of original" setting change screen in FIG. 5B is displayed, and "character", "photograph", and "character/photograph" buttons are displayed on this screen. Furthermore, image processing applied to scanned image data when each button is selected is the same as that described in FIGS. 5A to 5D. Furthermore, when an "advanced functions" button 1206 is pressed, an advanced functions screen 1208 in FIG. 12B is displayed on the console unit 203. This advanced functions screen 1208 will be described later. In addition, on a number of copies display portion 1207, when the user inputs the number of copies of a printed matter by using the numeric keypad 306 arranged on the console unit 203 in FIG. 3, the number of copies is displayed.

On the advanced functions screen 1208 in FIG. 12B, a "color adjustment" button 1209 and a "sharpness" button 1210 are displayed. When the user presses the "color adjustment" button 1209, a "color adjustment" setting change screen 1211 in FIG. 12C is displayed on the console unit 203. On the "color adjustment" setting change screen 1211, a yellow adjustment slider 1212, a magenta adjustment slider 1213, a cyan adjustment slider 1214, and a black adjustment slider 1215 are displayed. For instance, when the yellow adjustment slider 1212 is moved in the leftward direction, the yellow component after the image processing decreases, and when the slider 1212 is moved in the rightward direction, the yellow component after image processing increases. The magenta adjustment slider 1213, the cyan adjustment slider 1214, and the black adjustment slider 1215 also each have the same function.

Figure 13:
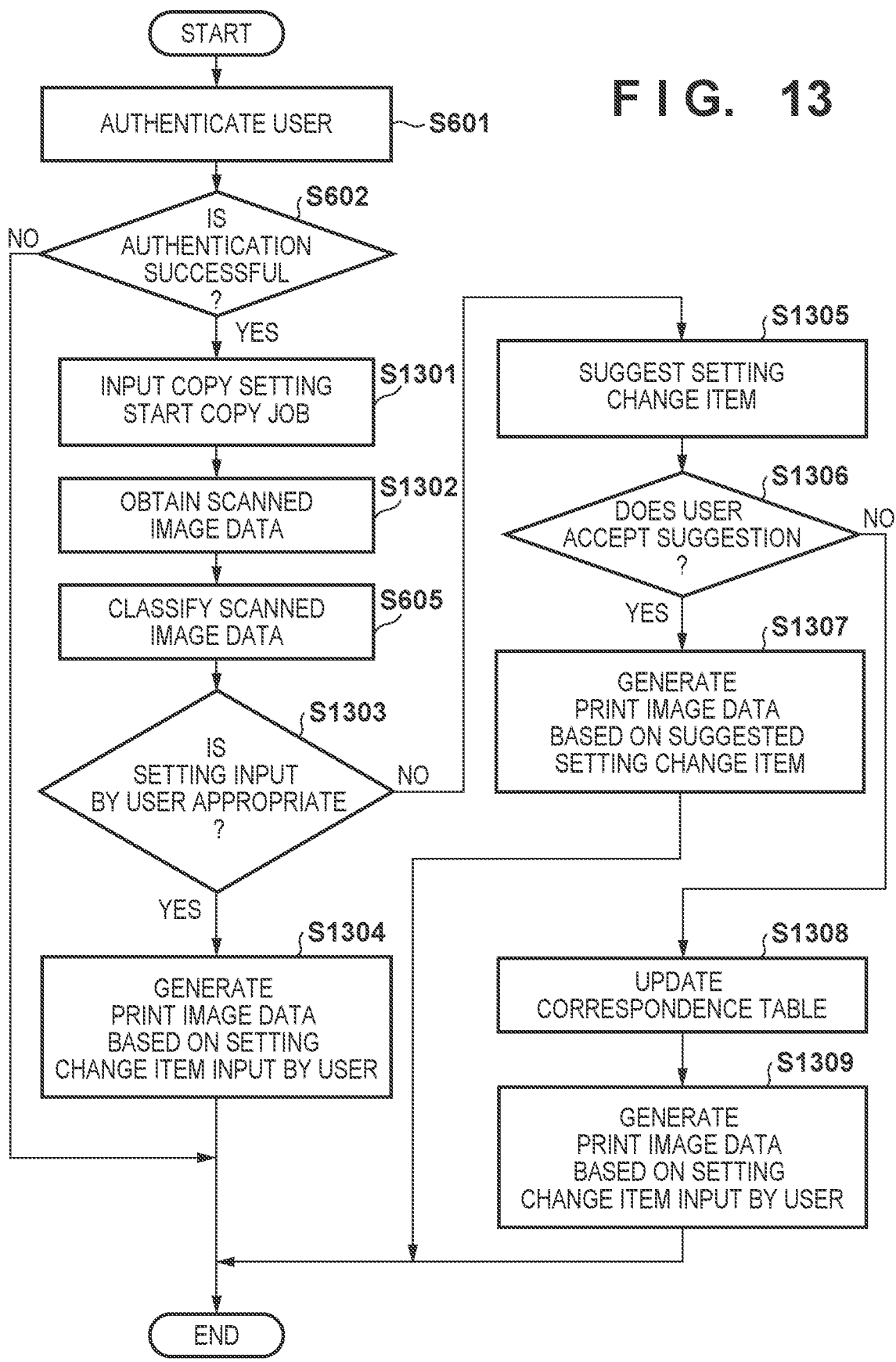
FIG. 13 is a flowchart for explaining processing of scanning a paper document and obtaining print image data in the MFP according to the second exemplary embodiment.

FIG. 13 is a flowchart for explaining processing of scanning a paper document and obtaining print image data, in the MFP 101 according to the second exemplary embodiment. Note that the processing described in this flowchart is achieved by the CPU 205 deploying the control program stored in the storage 211 to the RAM 206 and executing the program. This processing is started by the "copy" button 302 being pressed on the screen in FIG. 3. Note that in FIG. 13, processes common to those of FIG. 6 described above are denoted by the same reference numbers, and descriptions thereof will be omitted.

In step S1301, when input of a setting change is performed from the copy operation screens in FIGS. 12A to 12E displayed on the console unit 203 and the start key 307 arranged on the console unit 203 is pressed by a user, the CPU 205 starts a copy job. Next, the process proceeds to step S1302, the CPU 205 controls the scanner 201 to scan a paper document, and delivers scanned image data to the data processing unit 215 through the device I/F 214 and the image bus 217. Then, in step S605, the data processing unit 215 performs classification on the scanned image data by using a learned model. In this classification method, the same process as that of the first exemplary embodiment is performed.

Then, the process proceeds to step S1303, based on the classified type of the scanned image data and a correspondence table 1401 (FIG. 14A) of recommended setting to be described later, the CPU 205 determines whether or not a setting item input by a user is appropriate. This determination method will be described with reference to FIGS. 14A and 14B.

FIGS. 14A and 14B are diagrams for explaining types of the scanned image data and a change item of a copy setting corresponding thereto in the MFP 101 according to the second exemplary embodiment.

FIG. 14A illustrates the correspondence table 1401 representing a classification result of the learned model and a recommended setting corresponding thereto. For instance, in a case where the scanned image data is classified into the "document image" by the learned model, the setting items described in the "recommended setting" of the correspondence table 1401 are "density adjustment+1" and "character". These setting items are items that can be set and changed by the user operation on the copy operation screen of FIGS. 12A to 12E. In step S1303, the CPU 205 determines whether or not this recommended setting and the setting item input via the console unit 203 by the user match with each other. Here, in the case where it is determined that the two match with each other, it is determined that the setting item input by the user is appropriate and the process proceeds to step S1304, and the CPU 205 executes image processing based on the setting item input by the user through the console unit 203 at the data processing unit 215, and the process is terminated.

A method for generating print image data based on the setting item here will be described with reference to FIG. 14B.

Figure 12E:
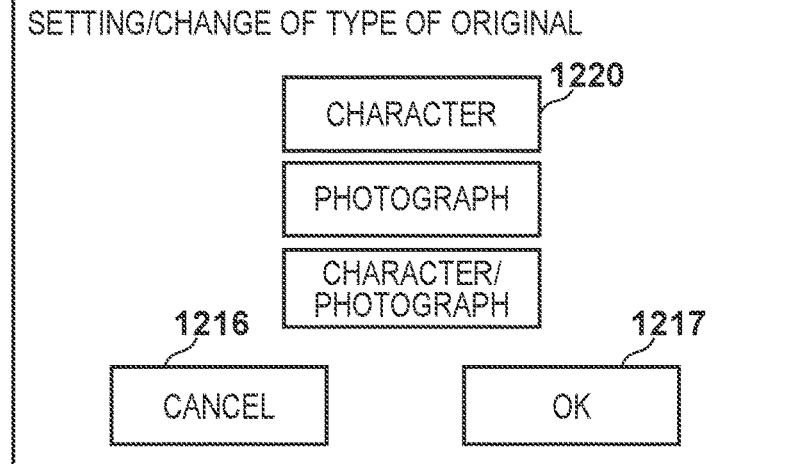

For instance, it is assumed that, for the document image 1402, the user selects the "character" button 1220 in FIG. 12E and moves the density adjustment slider 1218 in FIG. 12D by one stage in the rightward direction. In this case, for instance, since the "character" button is first selected, filtering processing for improving sharpness is applied to the whole image. Next, since the density adjustment slider 1218 is moved by one stage in the rightward direction, for instance, the RGB signal value of the whole image is reduced by "10". By the processing described above, print image data 1403 is generated.

On the other hand, in step S1303, when it is determined that the recommended setting and the setting item input by the user do not match with each other, the process proceeds to step S1305. In step S1305, the CPU 205 displays, on the console unit 203, a suggestion whether or not to execute image processing with the recommended setting based on the correspondence table 1401 representing the classification result of the learned model and the recommended setting corresponding thereto illustrated in FIG. 14A.

Figure 15:
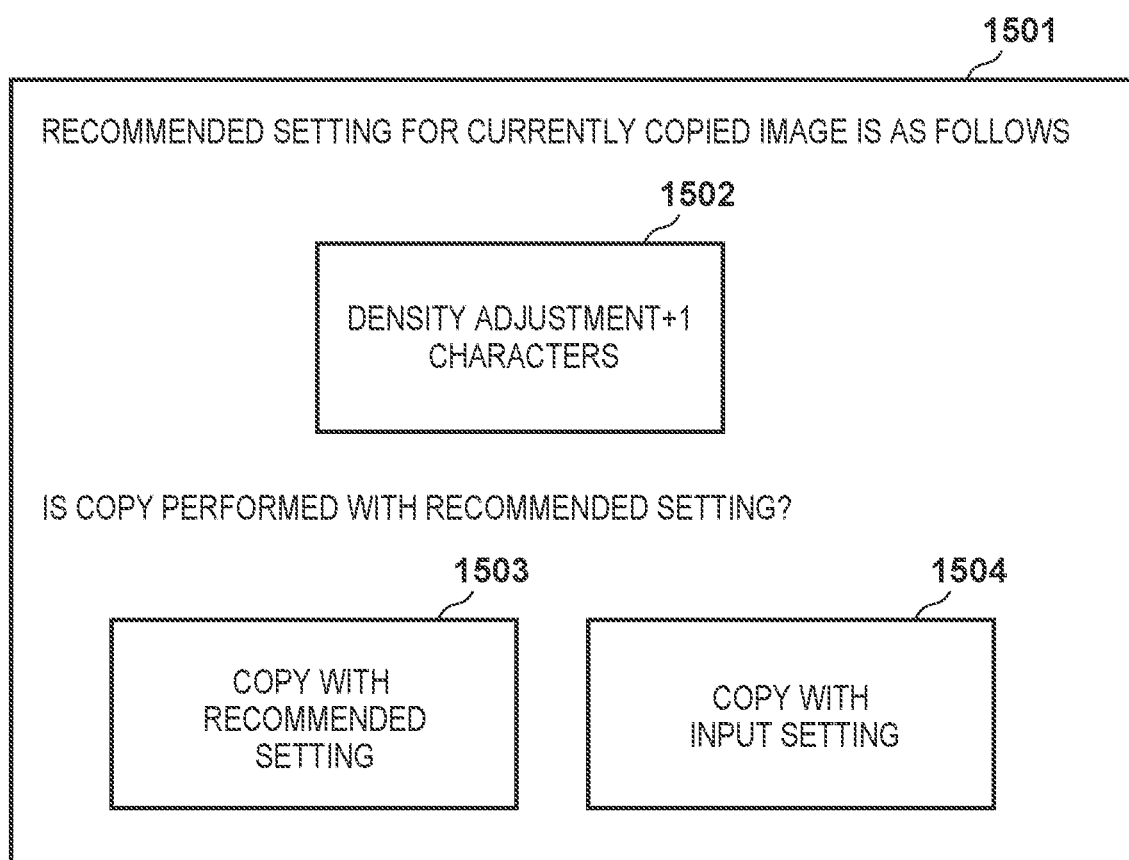
FIG. 15 is a diagram illustrating an example of a suggestion screen to be presented to a user in the MFP according to the second exemplary embodiment.

FIG. 15 is a diagram illustrating an example of a suggestion screen 1501 to be presented to the user in the MFP 101 according to the second exemplary embodiment.

A recommended setting item 1502 is displayed based on the result of classifying the scanned image data with the learned model in FIG. 8 and the correspondence table 1401 in FIG. 14A. Note that the suggestion screen 1501 is not limited thereto, and for instance, an image of print image data to be obtained by executing image processing with the recommended setting or a thumbnail image may be displayed on the suggestion screen 1501.

Next, the process proceeds to step S1306, the CPU 205 determines whether or not a "copy with recommended setting" button 1503 is pressed on the suggestion screen 1501. Here, when the "copy with recommended setting" button 1503 is pressed, the process proceeds to step S1307. In step S1307, the CPU 205 executes image processing based on the recommended setting item, and the process is terminated. For instance, in a case where the result of classifying the scanned image with the learned model is the "document image" in FIG. 14A, scanned image data to which "density adjustment+1" and "character", which constitute a combination of the setting items corresponding thereto, are applied are generated. The details of the processing are similar to the processing described in step S1304.

On the other hand, when a "copy with input setting" button 1504 is pressed on the suggestion screen 1501, the process proceeds to step S1308. In step S1308, the CPU 205 updates the correspondence table 1401 in FIG. 14A based on the setting item input by the user and the classification group when scanned image data are classified with the learned model. This update process is the same process as that in step S611 of the first exemplary embodiment described above, and thus descriptions thereof will be omitted.

Next, the process proceeds to step S1309, in the same manner as in step S1304, the CPU 205 causes the data processing unit 215 to execute generation of print image data based on the setting item input by the user through the console unit 203, and the process is terminated. The details of the processing of generation of the print image data based on the setting item here are similar to the processing described in step S1304, and thus descriptions thereof will be omitted.

As described above, according to the second exemplary embodiment, the load on the user to change the setting of the image processing for the input image data can be reduced. Furthermore, in a case where the user has poor knowledge of the image processing as well, it is possible to provide a printed matter desired by the user in a copy function.

Third Exemplary Embodiment

In the first exemplary embodiment and the second exemplary embodiment described above, the configuration in the case where a single paper document is scanned has been described, but in this third exemplary embodiment, a configuration in a case where plural pieces of paper documents are scanned will be described. Note that in the third exemplary embodiment, processing for generating scanned image data will be described, but a case where print image data at the time of copy operation is generated can also be executed with the same configuration. Note that the hardware configuration and the like of the MFP 101 according to the third exemplary embodiment is the same as that of the first exemplary embodiment described above, and thus the descriptions thereof will be omitted.

Figure 16:
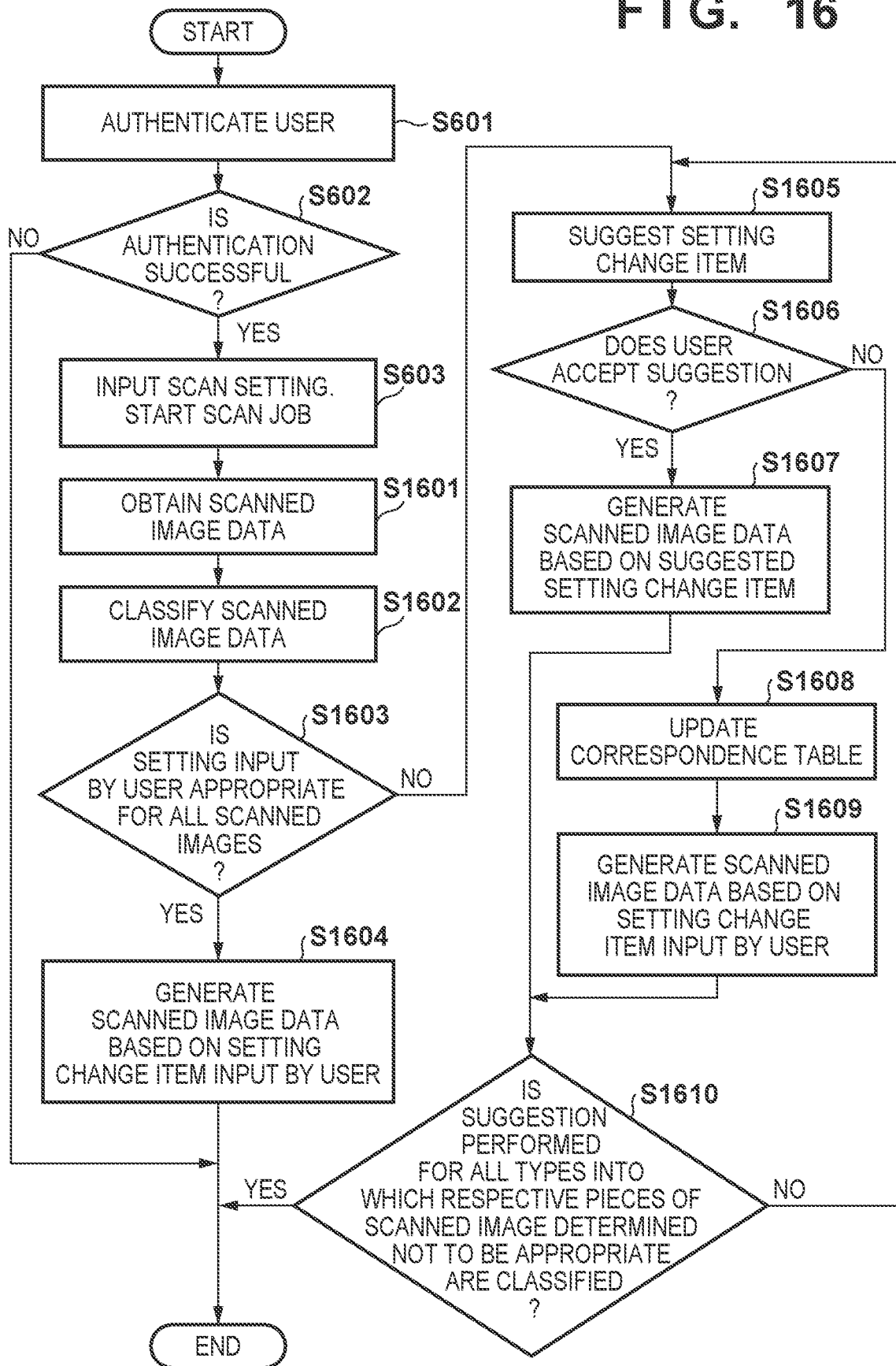
FIG. 16 is a flowchart for explaining processing of scanning plural pieces of paper documents and obtaining scan image data in an MFP according to a third exemplary embodiment.

FIG. 16 is a flowchart for explaining processing of scanning plural pieces of paper documents and obtaining scan image data, in the MFP 101 according to the third exemplary embodiment. Note that the processing described in this flowchart is achieved by the CPU 205 deploying the control program stored in the storage 211 to the RAM 206 and executing the program. This processing is started by the "scan" button 303 being pressed on the screen in FIG. 3. Note that in FIG. 16, processes common to those of FIG. 6 described above are denoted by the same reference numbers, and descriptions thereof will be omitted.

In step S1601, when a scan job is started, the CPU 205 causes the scanner 201 to scan and read the plural pieces of paper documents, and a scanned image data group is delivered to the data processing unit 215 through the device I/F 214 and the image bus 217. Next, the process proceeds to step S1602, the CPU 205 performs classification, by the data processing unit 215, on plural pieces of scanned image data, for each pieces of scanned image data by using a learned model. In this classification method, the same process as in step S605 in the first exemplary embodiment is performed. With this, the classification result is determined for each piece of scanned image data corresponding to one sheet.

Next, the process proceeds to step S1603, based on the type of the scanned image data classified in this manner and the correspondence table 1001 of recommended setting described in step S606 in FIG. 6, the CPU 205 determines whether or not the setting item input by the user is appropriate for each piece of scanned image data. Here, in all scanned image data, in a case where the recommended setting and the setting item input by the user match with each other, the process proceeds to step S1604, otherwise proceeds to step S1605. For instance, it is assumed that all the classification results of the scanned image data group obtained by scanning the plural pieces of paper documents with the scanner 201 are a "document image". Then, in a case where the setting item input by the user and the recommended setting of the "document image" in the correspondence table 1001 of the recommended setting described in step S606 in the first exemplary embodiment match with each other, the determination in step S1603 becomes Yes and the process proceeds to step S1604. In step S1604, the CPU 205 causes the data processing unit 215 to execute, for each piece of scanned image data, generation of scanned image data based on the setting item input by the user, and the process is terminated. The generation of the scanned data based on the setting item here is similar to step S607 in the first exemplary embodiment.

On the other hand, in step S1603, in a case where the CPU 205 determines that the setting input by the user is not appropriate, the process proceeds to step S1605. In step S1605, the CPU 205 displays, on the console unit 203, a suggestion whether or not to execute image processing with the recommended setting based on the correspondence table 1001 representing the classification result of the learned model and the recommended setting corresponding thereto illustrated in FIG. 10A. FIG. 17 illustrates an example of the suggestion screen displayed on the console unit 203.

FIGS. 17A and 17B are diagrams illustrating examples of suggestion screens to be presented to the user in the MFP 101 according to the third exemplary embodiment.

For instance, it is assumed that ten sheets of paper documents are scanned, and in step S1602, the first sheet to the fifth sheet are each classified into a document image, and the sixth sheet to the tenth sheet are each classified into a photograph. Then, in a case where the setting change input by the user is "character/photograph", in step S1605, the CPU 205 displays a suggestion screen 1701 in FIG. 17A on the console unit 203. Here, a reference numeral 1702 indicates a page display portion, and as a result of classification with the learned model in FIG. 8, this portion is displayed in accordance with on which sheet the scanned image group that have been determined to have the same type is located. Furthermore, a recommended setting item 1703 is displayed based on the result of classifying the scanned image data with the learned model in FIG. 8 and the correspondence table 1001 in FIG. 10A.

Next, the process proceeds to step S1606, when the CPU 205 determines that a "perform file generation with recommended setting" button 1704 is pressed by the user on the screen in FIG. 17A, the process proceeds to step S1607. In step S1607, the CPU 205 performs, for instance, image processing on the scanned images of the first sheet to the fifth sheet of the scanned image data group based on the recommended setting item, and the process proceeds to step S1610. The details of this processing in step S1607 are similar to the processing described in step S610.

On the other hand, in step S1606, in a case where it is determined that the user presses a "perform file generation with input setting" button 1705, the process proceeds to step S1608. In step S1608, the CPU 205 updates the correspondence table 1001 in FIG. 10A based on the setting item input by the user and the classification group when the scanned image data group is classified with the learned model. For instance, in the suggestion screen 1701 in FIG. 17A, in a case where the "perform file generation with input setting" button 1705 is pressed, the recommended setting item corresponding to the "document image" in the correspondence table 1001 is updated. In this update process, the same process as that in step S611 of the first exemplary embodiment described above is performed.

Next, the process proceeds to step S1609, in the same manner as in step S1604, the CPU 205 causes the data processing unit 215 to execute generation of scanned image data based on the setting item input by the user through the console unit 203, and the process proceeds to step S1610. Here, on the scanned image data of the first sheet to the fifth sheet of the scanned image data group, based on the setting item input by the user, the generation of scanned image data is performed. The details of this processing are similar to the processing described in step S1604.

In step S1610, the CPU 205 determines whether or not the suggestion is performed for all types into which respective pieces of the scanned image data determined not to be appropriate are classified. Here, since a suggestion for the "photograph" into which each piece of the scanned image data of the sixth sheet to the tenth sheet of the scanned image data group is classified is not performed, the process returns to step S1605, and a suggestion of a recommended setting item for the "photograph" is performed. FIG. 17B illustrates an example of the suggestion screen 1706 at this time.

Note that subsequent processes are the same as those in step S1606 to step S1610 described above, the CPU 205 makes the suggestion for all types in this manner, and terminates this processing.

As described above, according to the third exemplary embodiment, also in the case where the plural pieces of paper documents are scanned, the load to change the setting of the image processing for the input image data can be reduced. Furthermore, in a case where the user has poor knowledge of the image processing as well, it is possible to provide scanned image data desired by the user. Further it is possible to provide a printed matter using the scanned image data.

Fourth Exemplary Embodiment

In a fourth exemplary embodiment, another configuration in a case where plural pieces of paper documents are scanned will be described. Note that in the fourth exemplary embodiment, processing for generating scanned image data will be described, but a case where print image data at the time of copy operation is generated can also be executed with the same configuration. Note that the hardware configuration and the like of the MFP 101 according to the fourth exemplary embodiment is the same as that of the first exemplary embodiment described above, and thus the descriptions thereof will be omitted.

Figure 18:
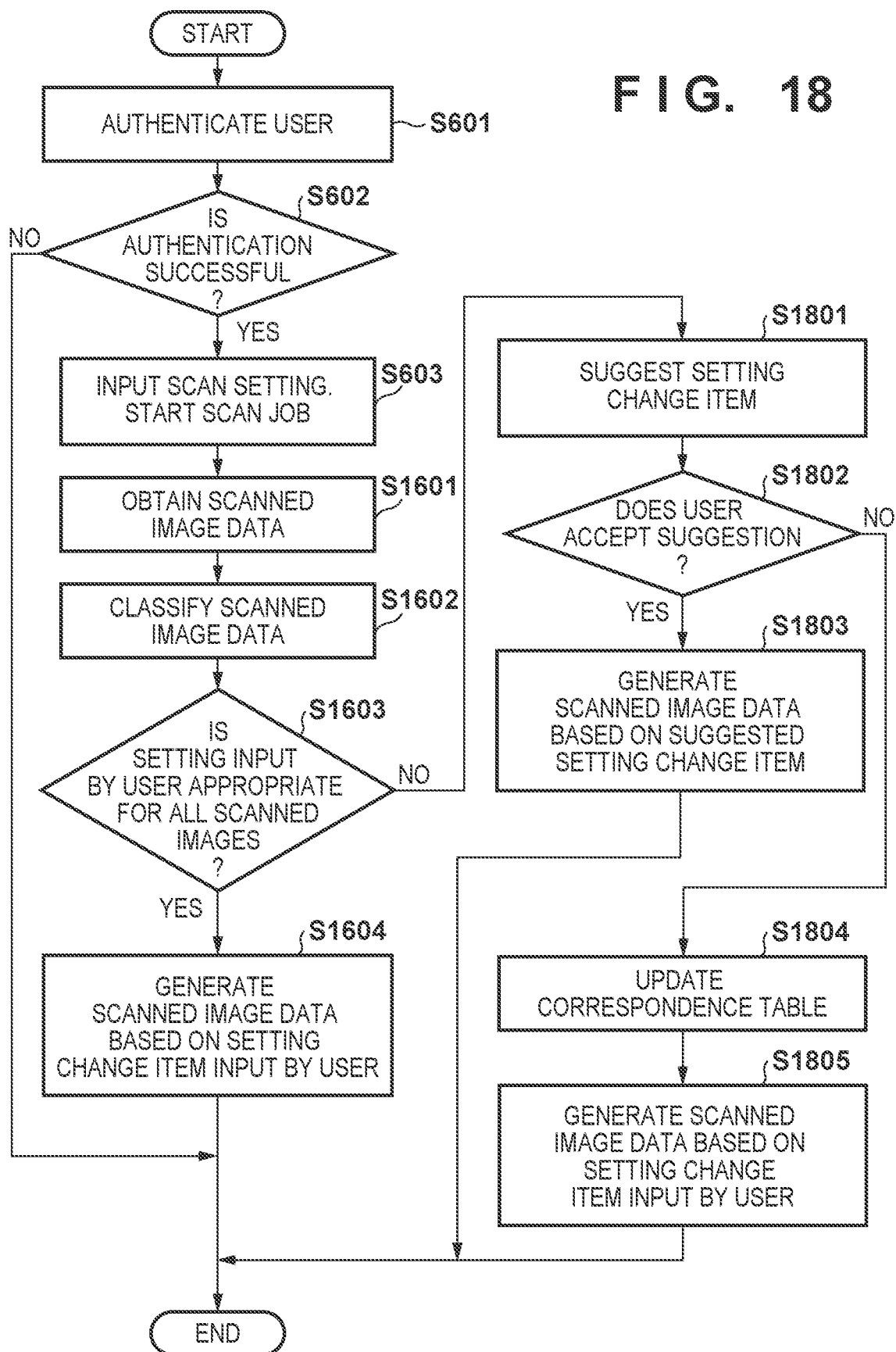
FIG. 18 is a flowchart for explaining processing of scanning plural pieces of paper documents and obtaining scanned image data in an MFP according to a fourth exemplary embodiment.

FIG. 18 is a flowchart for explaining processing of scanning the plural pieces of paper documents and obtaining scanned image data, in the MFP 101 according to the fourth exemplary embodiment. Note that the processing described in this flowchart is achieved by the CPU 205 deploying the control program stored in the storage 211 to the RAM 206 and executing the program. Note that in FIG. 18, processes common to those of FIG. 6 and FIG. 16 described above are denoted by the same reference numbers, and descriptions thereof will be omitted.

In step S1603, in a case where the CPU 205 determines that the setting input by the user is not appropriate, the process proceeds to step S1801. In step S1801, the CPU 205 displays, on the console unit 203, a suggestion whether or not to execute image processing with the recommended setting based on the correspondence table 1001 representing the classification result of the learned model and the recommended setting corresponding thereto illustrated in FIG. 10A.

Figure 19:
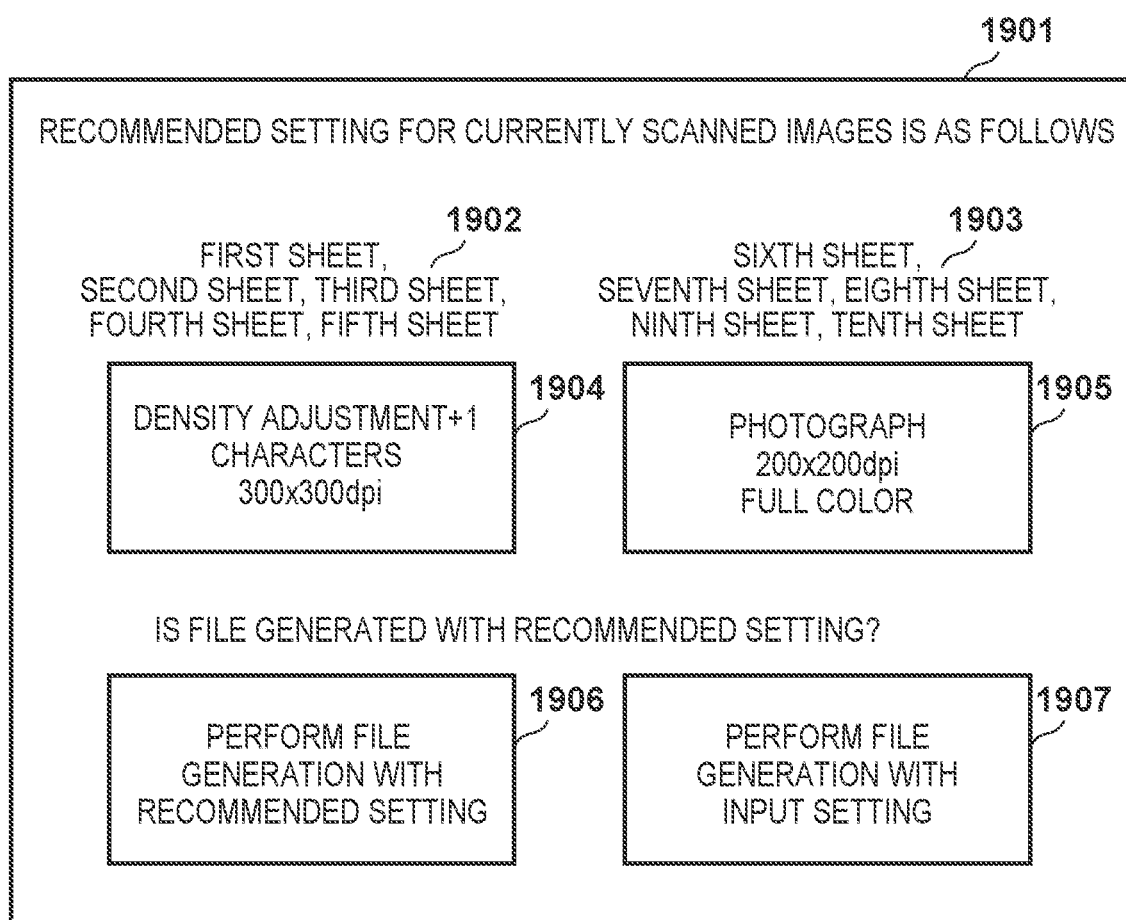
FIG. 19 is a diagram illustrating an example of a suggestion screen to be presented to a user in the MFP according to the fourth exemplary embodiment.

FIG. 19 is a diagram illustrating an example of a suggestion screen 1901 to be presented to the user in the MFP 101 according to the fourth exemplary embodiment.

For instance, it is a case where ten sheets of paper documents are scanned, the first sheet to the fifth sheet are each classified into a document image and the sixth sheet to the tenth sheet are each classified into a photograph in step S1602, and setting change input by the user is "character/photograph", the console unit 203 displays the suggestion screen 1901 in FIG. 19 in step S1801.

Here, reference numerals 1902 and 1903 each indicate a page display portion, and as a result of classification with the learned model of FIG. 8, the portion displays on which sheet the scanned image group that has been determined to have the same type is located for each type. In the fourth exemplary embodiment, since the first sheet to the fifth sheet have the same type and the sixth sheet to the tenth sheet have the same type, display as indicated by the reference numerals 1902 and 1903 is performed. Furthermore, recommended setting items 1904 and 1905 are displayed based on the result of classifying the scanned image data with the learned model in FIG. 8 and the correspondence table 1001 in FIG. 10A. In the fourth exemplary embodiment, since the first sheet to the fifth sheet have each been classified into a "document image", and the sixth sheet to the tenth sheet have each been classified into a "photograph", display as in the recommended setting item 1904 and the recommended setting item 1905 is respectively performed.

Next, the process proceeds to step S1802, the CPU 205 determines whether or not a "perform file generation with recommended setting" button 1906 is pressed by the user, and if so, the process proceeds to step S1803. In step S1803, the CPU 205 executes image processing for all the scanned image data based on the recommended setting item. The details of this processing are similar to the processing described in step S610 described above, and thus descriptions thereof will be omitted.

On the other hand, in step S1802, in a case where the CPU 205 determines that a "perform file generation with input setting" button 1907 is pressed, the process proceeds to step S1804. In step S1804, the CPU 205 updates the correspondence table 1001 in FIG. 10A based on the setting item input by the user and the classification group when the scanned image group is classified with the learned model. For instance, in the suggestion screen 1901 described above, in a case where the "perform file generation with input setting" button 1907 is pressed, the recommended setting item corresponding to the "document image" in the correspondence table 1001 and the recommended setting item corresponding to "photograph" in the correspondence table 1001 are updated. This update process is the same process as that in step S611 of the first exemplary embodiment, and thus descriptions thereof will be omitted.

Next, the process proceeds to step S1805, in the same manner as in step S1604, the CPU 205 causes the data processing unit 215 to execute generation of scanned image data based on the setting item input by the user through the console unit 203. In the fourth exemplary embodiment, on all the scanned image data of the scanned image data group, based on the setting item input by the user, the generation of scanned image data is performed. The details of this processing are similar to the processing described in step S1604, and thus descriptions thereof will be omitted.

As described above, according to the fourth exemplary embodiment, also in the case where the plural pieces of paper documents are scanned, the load to change the setting of the image processing for the input image data can be reduced. That is, it is possible to perform the processing with the same number of operations as in the case where one paper document is scanned as assumed in the first exemplary embodiment, and it is possible to reduce the setting change load on the user. Furthermore, in a case where the user has poor knowledge of the image processing as well, it is possible to provide scanned image data desired by the user. Further it is possible to provide a printed matter using the scanned image data.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-236969, filed Dec. 26, 2019, which is hereby incorporated by reference herein in its entirety.

What is claimed is:

1. An image processing apparatus comprising:
at least one processor and at least one memory configured to function as:
   a holding unit that holds a type of image data and a setting item of image processing corresponding to the type in association with each other;
   an operation unit that is operable to cause a user to input the setting item;
   an obtaining unit that obtains, by applying a learned learning model to image data which are input, a result of classifying the image data into the type; and
   a presentation unit that presents, based on the setting item input by the operation unit and the setting item that corresponds to the type of the image data obtained by the obtaining unit and is held by the holding unit, a recommended setting item corresponding to the image data to the user.

2. The image processing apparatus according to claim 1, wherein the presentation unit presents, in a case where the setting item input by the operation unit and the setting item that corresponds to the type of the image data and is held by the holding unit are different from each other, a setting item held in the holding means as the recommend setting item.

3. The image processing apparatus according to claim 2, wherein the at least one processor and the at least one memory configured to further function as:
   an updating unit that updates, in a case where, for presentation of the recommended setting item by the presentation unit, the user selects the setting item input by the operation unit, contents related to the recommended setting item held in the holding unit with the setting item input by the operation unit.

4. The image processing apparatus according to claim 3, wherein the updating unit updates, in a case where the number of times the user selects the setting item input by the operation unit becomes a predetermined number of times, contents related to the recommended setting item held in the holding unit with the setting item input by the operation unit.

5. The image processing apparatus according to claim 2, wherein the presentation unit further displays an image in a case where the image data is processed based on the recommended setting item corresponding to a type of the image data.

6. The image processing apparatus according to claim 1, wherein the presentation unit presents, in a case where the image data includes plural types of image data, the recommended setting item corresponding to each of the types of the image data obtained by the obtaining unit.

7. The image processing apparatus according to claim 1, wherein the presentation unit displays, in a case where the image data includes plural types of image data, pages of images in which the types of the image data obtained by the obtaining unit match with each other.

8. The image processing apparatus according to claim 7, wherein the presentation unit further displays a page of an image to which the recommended setting item is applied.

9. The image processing apparatus according to claim 1, wherein the image data is scanned image data obtained by reading a paper document with a scanner, and the image processing includes processing for the scanned image data.

10. The image processing apparatus according to claim 1, wherein the image data is image data for copy, and the image processing includes processing for print image data to be used in the copy.

11. A method of controlling an image processing apparatus which holds a type of image data and a setting item of image processing corresponding to the type in association with each other, the method comprising:
    causing a user to input the setting item;
    obtaining, by applying a learned learning model to image data which is input, a result of classifying the image data into the type; and
    presenting, based on the setting item that is input and the setting item that corresponds to the type of the image data that is obtained, and that is held, a recommended setting item corresponding to the image data to the user.

12. A non-transitory computer-readable storage medium storing a program for causing a processor to execute a method of controlling an image processing apparatus which holds a type of image data and a setting item of image processing corresponding to the type in association with each other, the method comprising:
    causing a user to input the setting item;
    obtaining, by applying a learned learning model to image data which is input, a result of classifying the image data into the type; and
    presenting, based on the setting item that is input and the setting item that corresponds to the type of the image data that is obtained, and that is held, a recommended setting item corresponding to the image data to the user.

* * * * *